US012043687B2

(12) United States Patent
Krallis et al.

(10) Patent No.: US 12,043,687 B2
(45) Date of Patent: Jul. 23, 2024

(54) PROCESS FOR POLYMERIZING ETHYLENE IN A MULTI-STAGE POLYMERIZATION PROCESS

(71) Applicant: BOREALIS AG, Vienna (AT)

(72) Inventors: Apostolos Krallis, Porvoo (FI);
Vasileios Kanellopoulos, Linz (AT);
Pascal Castro, Porvoo (FI); Vuokko Ojanperä, Porvoo (FI); Kumudini Jayaratne, Porvoo (FI)

(73) Assignee: Borealis AG, Vienna (AT)

( * ) Notice: Subject to any disclaimer, the term of this patent is extended or adjusted under 35 U.S.C. 154(b) by 708 days.

(21) Appl. No.: 17/259,216

(22) PCT Filed: Aug. 1, 2019

(86) PCT No.: PCT/EP2019/070791
§ 371 (c)(1),
(2) Date: Jan. 11, 2021

(87) PCT Pub. No.: WO2020/025757
PCT Pub. Date: Feb. 6, 2020

(65) Prior Publication Data
US 2021/0269560 A1 Sep. 2, 2021

(30) Foreign Application Priority Data
Aug. 2, 2018 (EP) ..................................... 18187014

(51) Int. Cl.
*C08F 210/16* (2006.01)
*C08F 2/00* (2006.01)
(Continued)

(52) U.S. Cl.
CPC ............ *C08F 4/6555* (2013.01); *C08F 2/001* (2013.01); *C08F 4/022* (2013.01); *C08F 4/651* (2013.01); *C08F 4/6543* (2013.01); *C08F 4/6546* (2013.01)

(58) Field of Classification Search
CPC ......... C08F 210/16; C08F 4/655; C08F 4/654
See application file for complete search history.

(56) References Cited

U.S. PATENT DOCUMENTS 3,324,093 A 6/1967 Alleman
3,405,109 A 10/1968 Rohlfing
(Continued)

FOREIGN PATENT DOCUMENTS

CN 101165074 A 4/2008
CN 101490163 A 7/2009
(Continued)

OTHER PUBLICATIONS

European Patent Office, Extended European Search Report in European Patent Application No. 18187014.8 (dated Mar. 4, 2019).
(Continued)

*Primary Examiner* — Caixia Lu
(74) *Attorney, Agent, or Firm* — Leydig, Voit & Mayer, Ltd.

(57) ABSTRACT

The present invention is concerned with a process for polymerizing ethylene or copolymerizing ethylene and at least one alpha-olefin comonomer in the presence of a supported polymerization catalyst in a multi-stage process in which the last polymerization stage is a gas phase reactor, the use of said process for reducing particle carry-over in the last polymerization stage and the use of a supported polymerization catalyst with a certain median particle size to polymerize an ethylene homo- or copolymer in said multi-stage process with a span of its particle size distribution
(Continued)

(a)

(b)

which can be predicted from the median particle size of the catalyst.

13 Claims, 4 Drawing Sheets

(51) Int. Cl.
    *C08F 4/02* (2006.01)
    *C08F 4/651* (2006.01)
    *C08F 4/654* (2006.01)
    *C08F 4/655* (2006.01)

(56) References Cited

U.S. PATENT DOCUMENTS

| | | | |
|---|---|---|---|
| 4,107,414 A | 8/1978 | Giannini et al. | |
| 4,186,107 A | 1/1980 | Wagner | |
| 4,226,963 A | 10/1980 | Giannini et al. | |
| 4,302,565 A | 11/1981 | Goeke et al. | |
| 4,347,160 A | 8/1982 | Epstein et al. | |
| 4,382,019 A | 5/1983 | Greco | |
| 4,435,550 A | 3/1984 | Ueno et al. | |
| 4,465,782 A | 8/1984 | McKenzie | |
| 4,472,524 A | 9/1984 | Albizzati | |
| 4,473,660 A | 9/1984 | Albizzati et al. | |
| 4,508,842 A | 4/1985 | Beran et al. | |
| 4,522,930 A | 6/1985 | Albizzati et al. | |
| 4,530,912 A | 7/1985 | Pullukat et al. | |
| 4,532,313 A | 7/1985 | Matlack | |
| 4,560,671 A | 12/1985 | Gross et al. | |
| 4,581,342 A | 4/1986 | Johnson et al. | |
| 4,582,816 A | 4/1986 | Miro | |
| 4,657,882 A | 4/1987 | Karayannis et al. | |
| 4,937,299 A | 6/1990 | Ewen et al. | |
| 5,087,522 A | 2/1992 | Bailly et al. | |
| 5,290,745 A | 3/1994 | Jorgensen et al. | |
| 5,317,036 A | 5/1994 | Brady, III et al. | |
| 5,332,793 A | 7/1994 | Cann | |
| 5,342,907 A | 8/1994 | Cann et al. | |
| 5,391,654 A | 2/1995 | Ahvenainen et al. | |
| 5,410,003 A | 4/1995 | Bai | |
| 5,527,752 A | 6/1996 | Reichle et al. | |
| 6,187,866 B1 | 2/2001 | Jorgensen et al. | |
| 6,248,831 B1 | 6/2001 | Maheshwari et al. | |
| 6,511,935 B2 | 1/2003 | Job | |
| 8,173,569 B2 | 5/2012 | Jorgensen et al. | |
| 9,133,287 B2 | 9/2015 | Jorgensen et al. | |
| 9,637,602 B2 | 5/2017 | Potter et al. | |
| 9,670,293 B2 | 6/2017 | Reznichenko et al. | |
| 9,670,347 B2 | 6/2017 | Tölsch et al. | |
| 9,708,481 B2 | 7/2017 | Wang et al. | |
| 9,745,431 B2 | 8/2017 | Potter et al. | |
| 9,751,962 B2 | 9/2017 | Wang et al. | |
| 9,777,142 B2 | 10/2017 | Sandholzer et al. | |
| 9,802,394 B2 | 10/2017 | Cavacas et al. | |
| 9,828,698 B2 | 11/2017 | Wang et al. | |
| 9,890,275 B2 | 2/2018 | Sandholzer et al. | |
| 9,976,020 B2 | 5/2018 | Nummila-Pakarinen et al. | |
| 10,011,708 B2 | 7/2018 | Lampela et al. | |
| 10,030,109 B2 | 7/2018 | Boragno et al. | |
| 10,040,930 B2 | 8/2018 | Gloger et al. | |
| 10,100,185 B2 | 10/2018 | Wang et al. | |
| 10,100,186 B2 | 10/2018 | Wang et al. | |
| 10,227,427 B2 | 3/2019 | Reichelt et al. | |
| 10,450,451 B2 | 10/2019 | Wang et al. | |
| 10,519,259 B2 | 12/2019 | Resconi et al. | |
| 10,870,718 B2 | 12/2020 | Denifl et al. | |
| 11,292,900 B2 | 4/2022 | Gahleitner et al. | |
| 11,390,732 B2 | 7/2022 | Van Houcke et al. | |
| 11,492,478 B2 | 11/2022 | Kniesel et al. | |
| 11,504,949 B2 | 11/2022 | Oderkerk et al. | |
| 11,518,863 B2 | 12/2022 | Vijay | |
| 11,530,321 B2 | 12/2022 | Kniesel et al. | |
| 2004/0010100 A1 | 1/2004 | Wagner et al. | |
| 2005/0003950 A1 | 1/2005 | Mink et al. | |
| 2008/0076951 A1 | 3/2008 | Jorgensen et al. | |
| 2011/0263801 A1 | 10/2011 | Garoff et al. | |
| 2012/0178888 A1 | 7/2012 | Jorgensen et al. | |
| 2013/0053521 A1* | 2/2013 | Singala | C01G 23/0536 502/107 |
| 2013/0217843 A1 | 8/2013 | McDaniel et al. | |
| 2014/0190723 A1 | 7/2014 | Vestberg et al. | |
| 2014/0275427 A1 | 9/2014 | Nummila-Pakarinen et al. | |
| 2016/0108148 A1 | 4/2016 | Mei et al. | |
| 2016/0185946 A1 | 6/2016 | Sandholzer et al. | |
| 2016/0194486 A1 | 7/2016 | Sandholzer et al. | |
| 2016/0200838 A1 | 7/2016 | Reznichenko et al. | |
| 2016/0208085 A1 | 7/2016 | Gloger et al. | |
| 2016/0229158 A1 | 8/2016 | Cavacas et al. | |
| 2016/0237266 A1* | 8/2016 | Michie, Jr. | H01B 3/441 |
| 2016/0237270 A1 | 8/2016 | Wang et al. | |
| 2016/0244539 A1 | 8/2016 | Resconi et al. | |
| 2016/0272740 A1 | 9/2016 | Wang et al. | |
| 2016/0280899 A1 | 9/2016 | Töltsch et al. | |
| 2016/0304681 A1 | 10/2016 | Potter et al. | |
| 2016/0311951 A1 | 10/2016 | Reichelt et al. | |
| 2016/0311988 A1 | 10/2016 | Potter et al. | |
| 2016/0312018 A1 | 10/2016 | Vestberg et al. | |
| 2016/0312019 A1 | 10/2016 | Lampela et al. | |
| 2016/0347943 A1 | 12/2016 | Wang et al. | |
| 2016/0347944 A1 | 12/2016 | Wang et al. | |
| 2016/0354747 A1* | 12/2016 | Al-Haj Ali | B01J 8/388 |
| 2017/0009068 A1 | 1/2017 | Kahlen et al. | |
| 2017/0029980 A1 | 2/2017 | Wang et al. | |
| 2017/0137617 A1 | 5/2017 | Wang et al. | |
| 2017/0166711 A1 | 6/2017 | Boragno et al. | |
| 2017/0218172 A1 | 8/2017 | Wang et al. | |
| 2017/0313867 A1 | 11/2017 | Lampela et al. | |
| 2017/0321048 A1 | 11/2017 | Nummila-Pakarinen et al. | |
| 2018/0079875 A1 | 3/2018 | Braun et al. | |
| 2018/0194881 A1 | 7/2018 | Denifl et al. | |
| 2020/0263015 A1 | 8/2020 | Kniesel et al. | |
| 2020/0270434 A1 | 8/2020 | Van Houcke et al. | |
| 2020/0277479 A1 | 9/2020 | Jerabek et al. | |
| 2020/0308353 A1 | 10/2020 | Jerabek et al. | |
| 2020/0347216 A1 | 11/2020 | Kniesel et al. | |
| 2020/0362065 A1* | 11/2020 | Rönkkö | C08F 10/06 |
| 2020/0392321 A1 | 12/2020 | Gahleitner et al. | |
| 2021/0114352 A1 | 4/2021 | Oderkerk et al. | |
| 2021/0171749 A1 | 6/2021 | Kumar et al. | |
| 2021/0171750 A1 | 6/2021 | Gahleitner et al. | |
| 2021/0214527 A1 | 7/2021 | Gahleitner et al. | |
| 2021/0214533 A1 | 7/2021 | Kulshreshtha et al. | |
| 2021/0238376 A1 | 8/2021 | Kahlen et al. | |
| 2021/0253836 A1 | 8/2021 | Gahleitner et al. | |
| 2021/0324189 A1 | 10/2021 | Prieto et al. | |
| 2021/0332227 A1 | 10/2021 | Wang et al. | |
| 2021/0347971 A1 | 11/2021 | Wang et al. | |
| 2022/0033631 A1 | 2/2022 | Gloger et al. | |
| 2022/0135779 A1 | 5/2022 | Wang et al. | |
| 2022/0204719 A1 | 6/2022 | Vijay | |
| 2022/0227965 A1 | 7/2022 | Ruemer et al. | |
| 2022/0251256 A1 | 8/2022 | Wang et al. | |
| 2022/0289955 A1 | 9/2022 | Kahlen et al. | |
| 2022/0306844 A1 | 9/2022 | Kahlen et al. | |
| 2022/0315716 A1 | 10/2022 | Prieto et al. | |
| 2022/0356330 A1 | 11/2022 | Kahlen et al. | |
| 2023/0046086 A1 | 2/2023 | Al-Haj Ali et al. | |
| 2023/0047329 A1 | 2/2023 | Al-Haj Ali | |

FOREIGN PATENT DOCUMENTS

| | | | |
|---|---|---|---|
| CN | 102516423 A | 6/2012 | |
| CN | 103396604 A | 11/2013 | |
| CN | 103764696 A | 4/2014 | |
| CN | 103987740 A | 8/2014 | |
| CN | 105209498 A | 12/2015 | |
| CN | 105408372 A | 3/2016 | |
| CN | 106167533 A | 11/2016 | |
| EP | 0 045 976 B1 | 11/1989 | |
| EP | 0 479 186 A2 | 4/1992 | |
| EP | 0 491 566 A2 | 6/1992 | |
| EP | 0 045 976 B2 | 12/1993 | |
| EP | 0 045 977 B2 | 3/1995 | |

(56) References Cited

FOREIGN PATENT DOCUMENTS

| | | |
|---|---|---|
| EP | 0 688 794 A1 | 12/1995 |
| EP | 0 754 708 A2 | 1/1997 |
| EP | 0 586 390 B1 | 5/1997 |
| EP | 0 810 235 A2 | 12/1997 |
| EP | 0 591 224 B1 | 2/1998 |
| EP | 0 887 380 A1 | 12/1998 |
| EP | 1 090 048 B1 | 12/2003 |
| EP | 1 378 528 A1 | 1/2004 |
| EP | 1 415 999 A1 | 5/2004 |
| EP | 1 538 167 A1 | 6/2005 |
| EP | 1 739 103 A1 | 1/2007 |
| EP | 1 752 462 A1 | 2/2007 |
| EP | 1 860 125 A1 | 11/2007 |
| EP | 2 495 037 A1 | 9/2012 |
| EP | 2 829 558 A1 | 1/2015 |
| EP | 2 913 345 A1 | 9/2015 |
| EP | 2 913 346 A1 | 9/2015 |
| EP | 3 103 818 A1 | 12/2016 |
| EP | 2 890 490 B1 | 5/2020 |
| GB | 1580635 A | 12/1980 |
| TW | 2006-13054 A | 5/2006 |
| WO | WO 92/12182 A1 | 7/1992 |
| WO | WO 95/12622 A1 | 5/1995 |
| WO | WO 95/032994 A1 | 12/1995 |
| WO | WO 96/18662 A1 | 6/1996 |
| WO | WO 96/032423 A1 | 10/1996 |
| WO | WO 97/28170 A1 | 8/1997 |
| WO | WO 98/032776 A1 | 7/1998 |
| WO | WO 98/58976 A1 | 12/1998 |
| WO | WO 98/58977 A1 | 12/1998 |
| WO | WO 99/051646 A1 | 10/1999 |
| WO | WO 01/155230 A1 | 8/2001 |
| WO | WO 03/010208 A1 | 2/2003 |
| WO | WO 03/051514 A1 | 6/2003 |
| WO | WO 03/51934 A2 | 6/2003 |
| WO | WO 03/051934 A2 | 6/2003 |
| WO | WO 03/106510 A1 | 12/2003 |
| WO | WO 2004/029112 A1 | 4/2004 |
| WO | WO 2004/085499 A2 | 10/2004 |
| WO | WO 2005/118655 A1 | 12/2005 |
| WO | WO 2006/023057 A1 | 3/2006 |
| WO | WO 2009/054832 A1 | 4/2009 |
| WO | WO 2012/007430 A1 | 1/2012 |
| WO | WO 2017/053375 A1 | 3/2017 |
| WO | WO 2019/238428 A1 | 12/2019 |

OTHER PUBLICATIONS

Taiwan Patent Office, Examination Report in Taiwanese Patent Application No. 108127366 (dated Mar. 5, 2020.
European Patent Office, International Search Report in International Application No. PCT/EP2019/070791 (dated Nov. 7, 2019).
European Patent Office, Written Opinion in International Application No. PCT/EP2019/070791 (dated Nov. 7, 2019).
European Patent Office, International Preliminary Report on Patentability in International Application No. PCT/EP2019/070791 (dated Feb. 2, 2021).
European Patent Office, Communication pursuant to Article 94(3) EPC issued in European Patent Application No. 19 746 485.2 (dated Mar. 30, 2023).
Albunia et al., *Multimodal Polymers with Supported Catalysts*, Springer, Switzerland (2019).
Bashir et al., "Applied Thermodynamics for Process Modeling in Catalytic Gas Phase Olefin Polymerization Reactors." *Macromolecular Reaction Engineering*, pp. 1-10. (Sep. 18, 2019).
Hamba et al., "Kinetic Study of Gas Phase Olefin Polymerization with a $TiCl_4/MgCl_2$ Catalyst. II. Kinetic Parameter Estimation and Model Building." *Journal of Polymer Science Part A: Polymer Chemistry*, pp. 2075-2096 (Dec. 20, 1996).
Hutchinson et al., "Polymerization of Olefins through Heterogeneous Catalysis IX. Experimental Study of Propylene Polymerization over a High Activity $MgCl_2$-Supported Ti Catalyst" *Journal of Applied Polymer Science*, vol. 43, pp. 1271-1285 (Jan. 3, 1991).
Kanellopoulos, Vasileios, "Declaration of Vasileios Kanellopoulos" pp. 1-5, (Jul. 14, 2022).
Kanellopoulos et al., "An Experimental and Theoretical Investigation into the Diffusion of Olefins in Semi-Crystalline Polymers: The Influence of Swelling in Polymer-Penetrant Systems." *Macromolecular Reaction Engineering*, vol. 1: pp. 106-118 (Oct. 10, 2006).
Kanellopoulos et al., "Prediction of Solubility of α-Olefins in Polyolefins Using a Combined Equation of State Molecular Dynamics Approach" *Industrial & Engineering Chemistry Research*, vol. 45(17): pp. 5870-5878 (Jul. 19, 2006).
Krallis et al., "Application of Sanchez-Lacombe and Perturbed-Chain Statistical Associating Fluid Theory Equation of State Models in Catalytic Olefins (Co)polymerization Industrial Applications" *Industrial & Engineering Chemistry Research*, vol. 52: pp. 9060-9068 (Jun. 6, 2013).
"Response to the Official Communication", Borealis AG, pp. 1-5 (Sep. 9, 2021).
Zacca et al., "Modelling of the Liquid Phase Polymerization of Olefins in Loop Reactors" *Chemical Engineering Science*, vol. 48(22): pp. 3743-3765 (May 19, 1993).
Zacca et al., "Reactor residence time distribution effects on the multistage polymerization of olefins—II . Polymer properties: bimodal polypropylene and liner low-density polyethylene" *Chemical Engineering Science*, vol. 52(12): pp. 1941-1967 (Jan. 14, 1997).
China Intellectual Property Administration, The First Office Action in Chinese Patent Application No. 201980046249.7 (dated Jul. 20, 2022).
U.S. Appl. No. 14/911,295, filed Feb. 10, 2016.
U.S. Appl. No. 14/911,299, filed Feb. 10, 2016.
U.S. Appl. No. 14/911,300, filed Feb. 10, 2016.
U.S. Appl. No. 14/914,501, filed Feb. 25, 2016.
U.S. Appl. No. 15/022,664, filed Mar. 17, 2016.
U.S. Appl. No. 15/022,671, filed Mar. 17, 2016.
U.S. Appl. No. 15/027,129, filed Apr. 4, 2016.
U.S. Appl. No. 15/029,493, filed Apr. 14, 2016.
U.S. Appl. No. 15/030,556, filed Apr. 19, 2016.
U.S. Appl. No. 15/039,107, filed May 25, 2016.
U.S. Appl. No. 15/101,837, filed Jun. 3, 2016.
U.S. Appl. No. 15/102,628, filed Jun. 8, 2016.
U.S. Appl. No. 15/103,744, filed Jun. 10, 2016.
U.S. Appl. No. 15/103,783, filed Jun. 10, 2016.
U.S. Appl. No. 15/106,101, filed Jun. 17, 2016.
U.S. Appl. No. 15/113,517, filed Jul. 22, 2016.
U.S. Appl. No. 15/113,907, filed Jul. 25, 2016.
U.S. Appl. No. 15/113,922, filed Jul. 25, 2016.
U.S. Appl. No. 15/115,929, filed Aug. 2, 2016.
U.S. Appl. No. 15/310,283, filed Nov. 10, 2016.
U.S. Appl. No. 15/514,641, filed Mar. 27, 2017.
U.S. Appl. No. 15/526,957, filed May 15, 2017.
U.S. Appl. No. 15/531,974, filed May 31, 2017.
U.S. Appl. No. 15/566,588, filed Oct. 13, 2017.
U.S. Appl. No. 15/733,971, filed Dec. 1, 2020.
U.S. Appl. No. 15/741,861, filed Jan. 4, 2018.
U.S. Appl. No. 16/633,699, filed Jan. 24, 2020.
U.S. Appl. No. 16/652,115, filed Mar. 30, 2020.
U.S. Appl. No. 16/761,743, filed May 5, 2020.
U.S. Appl. No. 16/761,757, filed May 5, 2020.
U.S. Appl. No. 16/763,001, filed May 11, 2020.
U.S. Appl. No. 16/763,014, filed May 11, 2020.
U.S. Appl. No. 16/768,330, filed May 29, 2020.
U.S. Appl. No. 16/973,673, filed Dec. 9, 2020.
U.S. Appl. No. 16/982,385, filed Sep. 18, 2020.
U.S. Appl. No. 17/047,350, filed Oct. 13, 2020.
U.S. Appl. No. 17/050,550, filed Oct. 26, 2020.
U.S. Appl. No. 17/052,233, filed Nov. 2, 2020.
U.S. Appl. No. 17/276,275, filed Mar. 16, 2021.
U.S. Appl. No. 17/276,322, filed Mar. 16, 2021.
United Arab Emirates Ministry of Economy, Office Action—1st Summary, Examination Results, and Search Report in United Arab

(56) References Cited

OTHER PUBLICATIONS

Emirates Patent Application No. P6000050/2021 (dated Dec. 20, 2023).

\* cited by examiner

PROCESS FOR POLYMERIZING ETHYLENE IN A MULTI-STAGE POLYMERIZATION PROCESS

CROSS-REFERENCE TO RELATED APPLICATIONS

This patent application is the U.S. national phase of International Application No. PCT/EP2019/070791, filed on Aug. 1, 2019, which claims the benefit of European Patent Application No. 18187014.8, filed Aug. 2, 2018, the disclosures of which are incorporated herein by reference in their entireties for all purposes.

The present invention is concerned with a process for polymerizing ethylene or copolymerizing ethylene and at least one alpha-olefin comonomer in the presence of a supported polymerization catalyst in a multi-stage process in which the last polymerization stage is a gas phase reactor, the use of said process for reducing particle carry-over in the last polymerization stage and the use of a supported polymerization catalyst with a certain median particle size to polymerize an ethylene homo- or copolymer in said multi-stage process with a span of its particle size distribution which can be predicted from the median particle size of the catalyst.

BACKGROUND OF THE INVENTION

Multimodal polyethylene resins are usually polymerized in multi-stage processes in which the different fractions of the multimodal polyethylene resins are polymerized under different polymerization conditions in several polymerization reactors which are connected in series.

Suitably the polyethylene fraction with a high weight average molecular weight thereby is polymerized in a gas phase reactor.

In certain multi-stage polymerization processes such as the Borstar® process the gas phase reactor is set in the last polymerization stage for polymerizing multi-modal ethylene homo- or copolymers. In the Borstar® process the polymerization in one or more polymerization stages in the slurry phase occurs in either in subcritical or supercritical propane, followed by a flashing step and then one final polymerization stage in a gas phase reactor. According to this process, the product portfolio can be largely extended while product homogeneity in terms of molecular weight distribution and particle size distribution can be enhanced.

Gas phase reactors used in polyolefin industry are typically bubbling fluidized beds where gas and solids are in contact in a well specified/defined hydrodynamic regime.

In conventional fluidized bed reactors the gases enter the reactor via a distribution plate. The fluidized bed of catalytic particles is generated and maintained in reaction zone on which particles further polymer is formed due to the polymerization reaction. At the top of the fluidized bed reactor (1) the polymer particles are separated from the gas in a disengaging zone (also known as freeboard region).

A different fluidized bed reactor relates to the so called "double cone reactor design" which has been presented for example in EP2495037, EP2495038, EP2913346, EP2913345, EP2890490, EP 3103818. A double cone reactor has a bottom zone of a generally conical shape, a middle zone of a generally cylindrical shape and a top zone of a generally conical shape. The fluidisation gas is introduced into the bottom zone. A fluidized bed of catalytic particles starts to form within the bottom zone. The gas continues to travel upwards through the middle zone where the gas velocity is constant and the bed is fully formed. Finally, the gas reaches the top zone from where the fluidization gas together with entrained solids are withdrawn.

The performance and operability of such reactors largely depends on the morphological and size-related properties of the fluidized material. More specifically, the broader the particle size distribution of the fluidized material the higher the risk of causing segregation phenomena in the reactor. In addition, the larger the fraction of small size particles (i.e., particles with sizes less than 200 µm) the higher the tendency of solids carry over (entrainment) which in turn results in heat exchangers and compressor lines fouling. On top of the practical operability issues, particles having broad particle size distribution contribute in decreasing the mixing quality in the bed, disturbing the fluidization and creating more dead reactor zones (i.e., areas where the gas-solids mixing is poor).

Factors/parameters/features/descriptors contributing in producing particulate matter having broad particle size distributions in olefin polymerization processes can be classified into two categories i) process related and ii) catalyst related. The former is associated to mechanical forces acting on the polymer particles during their stay in the loop reactors and in the flash separator which is placed after the loop reactors and before the gas phase reactor. The latter regards the catalyst fragmentation behaviour as well as the original catalyst size distribution characteristics. The broader the catalyst size distribution the broader the final polymer particles distribution will be due to residence time distribution effect. Therefore, it is extremely important to establish a window regarding the catalyst size characteristics (i.e., median particle size, span of the particle size distribution) which would be acceptable for running the reactor in Borstar® process with less risk of creating operability challenges.

In Borstar® process, all polymerization stages are carried out in continuous mode, thus residence time effects are present resulting in polymer particles with different polymerization histories and sizes. Therefore, the size-related characteristics of the initial catalyst size distribution determine to certain extend the particle size distribution developments in the gas phase reactor. In case of very broad size distribution of the polymer particles in the GPR severe operability issues in the reactor associated to solids carry over, segregation phenomena, poor fluidization and low mass transfer rates of gaseous components (i.e., diluents, reactants, chain transfer agents) from the gas phase to the growing polymer particles. Moreover, excessive sheeting and chunking can be manifested.

In the present invention a correlation between the morphological characteristics of the supported polymerization catalyst and the particle size distribution of the ethylene homo- or copolymer has been developed. Following the proposed correlation, steady operation of the gas phase reactor, which is the last polymerization process step of a multi-stage polymerization process, can be obtained.

SUMMARY OF THE INVENTION

The present invention relates to a process for polymerizing ethylene or copolymerizing ethylene and at least one alpha-olefin comonomer with 3 to 12 carbon atoms in the presence of a supported polymerization catalyst in a multi-stage polymerization process in which at least two polymerization stages are connected in series and the last polymerization stage is conducted in a gas phase reactor to obtain an ethylene homo- or copolymer, wherein in the first polymerization stage, which is not a pre-polymerization stage, the catalyst activity is at least 15 kg/$g_{catalyst}$/h; and in each polymerization stage subsequent to said first polymerization stage the catalyst activity is not more than 75% of the catalyst activity in said first polymerization stage.

Further, the present invention relates to the use of the process according to the invention as defined above or below for reducing particle carry-over in the last polymerization stage.

Still further, the present invention relates to the use of a supported polymerization catalyst having an median particle size $d_{50cat}$ of from 5 to 30 µm in a multi-stage polymerization process in which at least two polymerization stages are connected in series and the last polymerization stage is conducted in a fluidized bed reactor comprising a distribution plate and a disengaging zone wherein in the first polymerization stage, which is not a pre-polymerization stage, the catalyst activity is at least 15 kg/$g_{catalyst}$/h;

in each polymerization stage subsequent to said first polymerization stage the catalyst activity is not more than 75% of the catalyst activity in said first polymerization stage; and the particle size distribution of the supported catalyst particles ($PSD_{cat}$) has a relative span following the inequation (II)

$$span_{cat} \leq 2.4 - 0.16 \cdot d_{50cat} + 0.0107 \cdot d_{50cat}^2 - 2.58 \cdot 10^{-4} \cdot d_{50cat}^3 \quad (II)$$

whereby $span_{cat}$ is the relative span of the particle size distribution of the supported catalyst particles ($PSD_{cat}$);

$d_{50cat}$ is the diameter of the particles of the supported polymerization catalyst at which 50% of the sample's mass is comprised of particles with a diameter less than this value (median particle size) in µm, for polymerizing an ethylene homo- or copolymer.

Alternatively, the present invention relates to the use of a supported polymerization catalyst having an median particle size $d_{50cat}$ of from 5 to 30 µm in a multi-stage polymerization process in which at least two polymerization stages are connected in series and the last polymerization stage is conducted in a double cone reactor wherein in the first polymerization stage, which is not a pre-polymerization stage, the catalyst activity is at least 15 kg/$g_{catalyst}$/h;

in each polymerization stage subsequent to said first polymerization stage the catalyst activity is not more than 75% of the catalyst activity in said first polymerization stage; and the particle size distribution of the supported catalyst particles ($PSD_{cat}$) has a relative span following the inequation (II)

$$span_{cat} \leq 2.81 - 0.20 \cdot d_{50cat} + 0.0131 \cdot d_{50cat}^2 - 3.12 \cdot 10^{-4} \cdot d_{50cat}^3 \quad (III)$$

whereby $span_{cat}$ is the relative span of the particle size distribution of the supported catalyst particles ($PSD_{cat}$);

$d_{50cat}$ is the diameter of the particles of the supported polymerization catalyst at which 50% of the sample's mass is comprised of particles with a diameter less than this value (median particle size) in µm, for polymerizing an ethylene homo- or copolymer.

Definitions

An ethylene polymer denotes a polymer derived from at least 50 mol-% ethylene monomer units and additional comonomer units.

An ethylene homopolymer thereby denotes a polymer consisting essentially of ethylene monomer units. Due to the requirements of large-scale polymerization it may be possible that the ethylene homopolymer includes minor amounts of comonomer units, which usually is below 0.1 mol %, preferably below 0.05 mol %, most preferably below 0.01 mol % of the ethylene homopolymer.

An ethylene copolymer denotes a polymer consisting of ethylene monomer units and comonomer units in an amount of at least 0.1 mol %. In an ethylene random copolymer the comonomer units are randomly distributed in the polymer chain.

The term 'different' denotes that a polymeric component differs from another polymeric component in at least one measureable property. Suitable properties for differentiating polymeric components are weight average molecular weight, melt flow rate $MFR_2$ or $MFR_5$, density or comonomer content.

A multi-stage polymerization process is a polymerization process in which two or more polymerization reactors are connected in series.

The particle size and particle size distribution is a measure for the size of the polymer particles polymerized in the gas phase reactor as well as for the size of the polymerization catalyst particles. The D-values ($d_{10}$, $d_{50}$ and $d_{90}$) represent the intercepts for 10%, 50% and 90% of the cumulative mass of sample. The D-values can be thought of as the diameter of the sphere which divides the sample's mass into a specified percentage when the particles are arranged on an ascending mass basis.

For example the $d_{10}$ is the diameter at which 10% of the sample's mass is comprised of particles with a diameter less than this value. The $d_{50}$ is the diameter of the particle that 50% of a sample's mass is smaller than and 50% of a sample's mass is larger than. The $d_{90}$ is the diameter at which 90% of the sample's mass is comprised of particles with a diameter less than this value. The $d_{50}$ value is also called median particle size or average particle size. From laser diffraction measurements according to ASTM 13320-1 the volumetric D-values are obtained, based on the volume distribution.

The distribution width or span of the particle size distribution is calculated from the D-values $d_{10}$, $d_{50}$ and $d_{90}$ according to the below formula:

$$\text{Span} = \frac{d_{90} - d_{10}}{d_{50}}$$

The mean particle size is a calculated value similar to the concept of average. From laser diffraction measurements according to ASTM 13320-1 the volume based mean particle size is obtained and calculated as follows:

$$\bar{D}_{pq}^{(p-q)} = \frac{\sum D_i^p}{\sum D_i^q}$$

wherein
D=the average or mean particle size
(p−q)=the algebraic power of $D_{pq}$, whereby p>q
$D_i$=the diameter of the ith particle
Σ=the summation of $D_{ip}$ or $D_{iq}$ representing all particles in the sample Only in symmetric particle size distributions the mean particle size and the median or average particle size $d_{50}$ have the same value.

The skeletal density (also termed absolute, true, real or apparent density) is obtained when the volume of a particle measured excludes the pores, cavities as well as the void spaces between the particles within the bulk sample. The skeletal powder density or absolute powder density is defined according to British Standards Institution as the mass of powder per unit of absolute powder volume whereby the absolute powder volume is defined as the volume occupied by a powder excluding all pores and voids. The skeletal density can be measured by using water or another liquid which is expected to fill the pores in the sample, thus removing their volume from the measurement. The skeletal density can also be measured by employing an apparatus, called Pycnometer, distributed by Micromeritics, Norcross (USA) that utilizes helium or any other inert gas.

The bulk density or envelope density is determined for porous material when pore spaces within the material particles are included in the volume measurement. The bulk density is measured according to ASTM C29/C29M, ASTM D6683 or ASTM D7481.

The BET surface area is a specific surface area of materials evaluated by nitrogen multilayer absorption measured as a function of relative pressure. The specific surface area thereby reflects the external surface area and open pores of macroporous and mesoporous materials, along with pore volume and area distributions that characterize porosity below the effective range of mercury intrusion porosimetry.

The BET surface area is measured according to DIN 66131/2 with nitrogen ($N_2$).

Unless specifically otherwise defined, the percentage numbers used in the text refer to percentage by weight.

FIGURES

Figure 5:
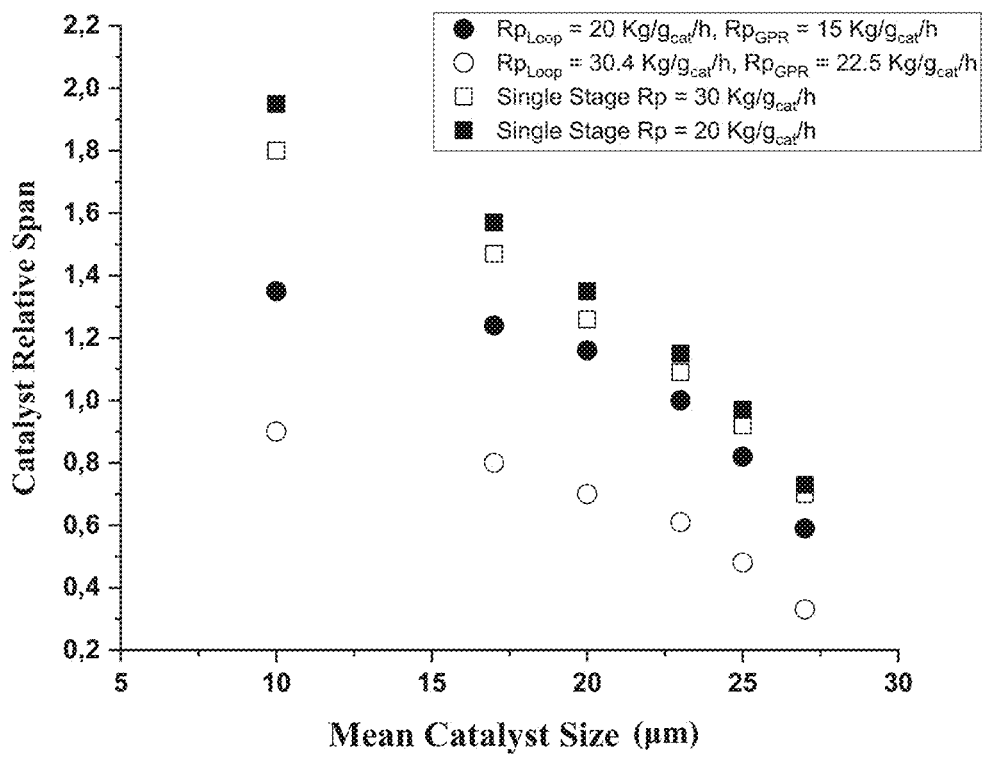

FIG. 5 shows the catalyst relative span (i.e., $d_{90}−d_{10}/d_{50}$) which ensures good operability of a fluidized bed phase reactor comprising a distribution plate and a disengaging zone with respect to average catalyst size ($d_{50}$) for two-stage loop-gas phase ethylene polymerization configuration and single stage gas phase reactor ethylene polymerization configurations. Catalysts with relative span in the area below the curve will ensure a smooth operability of the gas phase reactor.

Figure 6:
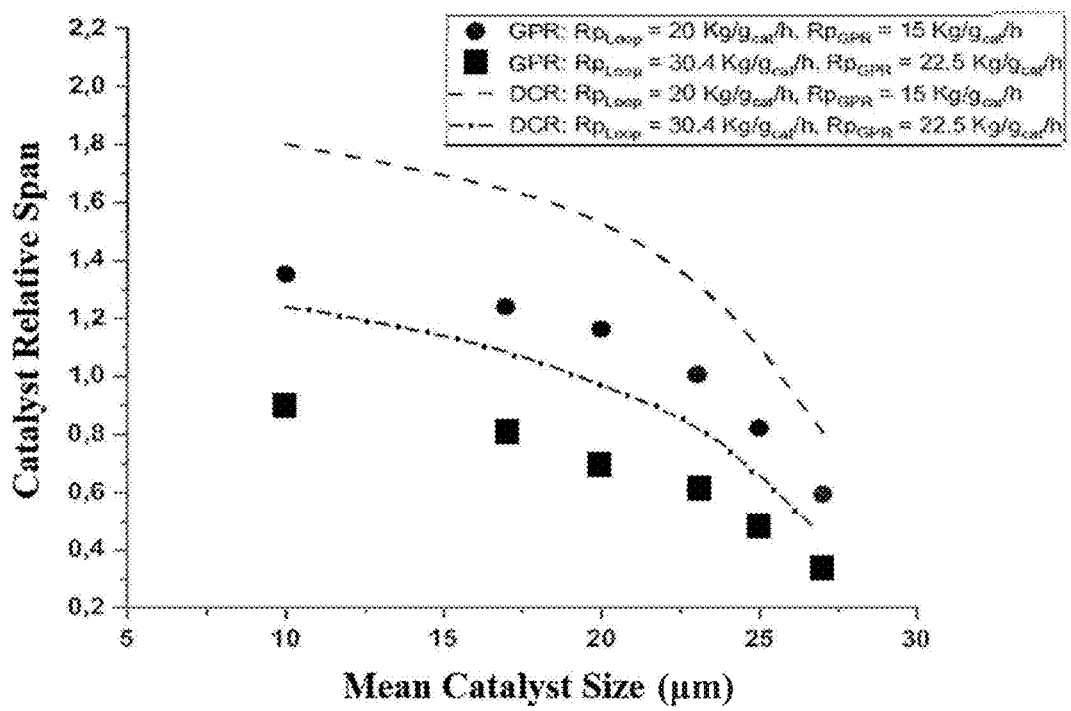

FIG. 6 shows a comparison of the catalyst relative span (i.e., $d_{90}−d_{10}/d_{50}$) which ensures good operability of a fluidized bed phase reactor comprising a distribution plate and a disengaging zone (dots) and a double cone reactor (dashed line) with respect to average catalyst size ($d_{50}$) for two-stage loop-gas phase ethylene polymerization configuration ethylene polymerization configurations. Catalysts with relative span in the area below the curve will ensure a smooth operability of the gas phase reactor.

DETAILED DESCRIPTION

The present invention is based on the idea that descriptors of the supported polymerization catalyst can be used to ensure steady operation conditions in the last polymerization stage of a multi-stage polymerization process, which is conduced in a gas phase reactor.

By carefully selecting the supported polymerization catalyst on basis of at least one several descriptors identified in the present invention the particle size distribution of the ethylene polymer can be maintained in a desired range of from 200 μm to 1300 μm in the last polymerization stage which ensures a smooth operation in the gas phase reactor.

In one approach, a catalyst is chosen which shows a high catalyst activity in the first polymerization stage, which is not a pre-polymerization stage, but a lower catalyst activity in the subsequent polymerization stages.

This ensures a specific kinetic profile of the polymerization reaction in the multi-stage process in regard of polymerization rates in the different polymerization stages, which allows a broader window for selecting the particle size distribution of the supported polymerization catalyst.

Thereby, choosing a catalyst with a suitably narrow particle size distribution results in a favourable polymer particle size distribution in the last polymerization stage which minimizes segregation, particles carry over (also termed as particles entrainment) and poor gas-solids mixing patterns in the gas phase reactor.

In a further approach, a catalyst is chosen which has a skeletal density above a certain lower limit. Catalysts with a low skeletal density tend to undergo violent fragmentation during the polymerization process, which produces catalyst fines which in turn result in a population of particulate matter in the gas phase reactor having a very small particle size distribution. Thus, for a given kinetic profile of a catalyst (catalyst activity and polymerisation rates in the different polymerization stages), the polymer particles size in the gas phase reactor will be of such a size that the reactor operation will be performed smoothly (no segregation, no carry over, no poor mixing). The proposed criteria for selecting whether a catalyst is suitable for the process of the invention will substantially reduce the risk of carrying over fines originated from the catalyst particles population.

Careful selection of the catalyst descriptors will result in the following benefits:
  Assuring smooth catalyst fragmentation process
  Polymer particle size distribution in gas phase reactor in a proper range so no operability issues related to very small and very big size particles (particles carry over, particles segregation, formation of sheeting and chunking)
  Enhanced homogeneity of polymer produced (small particles experience very short residence time in the loop reactors).
  Less risk for fines formation associated with the catalyst particles population
  Less risk for sheeting and chunking in the gas phase reactor Broadening the operating window in the gas phase reactor (higher superficial gas velocities) since less segregation and increased gas-solid mixing quality are expected.

Polymerization

Preferably, the process of the present invention is used for polymerizing ethylene, optionally with one or more comonomers selected from alpha-olefins having from 3 to 8 carbon atoms, such as propylene, 1-butene, 1-hexene, 4-methyl-1-pentene and 1-octene. Especially preferred are propylene, 1-butene and 1-hexene. Mostly preferred are 1-butene and 1-hexene.

Thus, the polymer material is preferably selected from ethylene homo- or copolymers. The comonomer units of ethylene copolymers are preferably selected from one or more comonomers selected from alpha-olefins having from 4 to 8 carbon atoms, such as 1-butene, 1-hexene, 4-methyl-1-pentene and 1-octene. Especially preferred are 1-butene and 1-hexene. Mostly preferred is 1-hexene.

Catalyst

The polymerization is conducted in the presence of a supported olefin polymerization catalyst. The catalyst may be any catalyst, which is capable of producing the desired olefin polymer. Suitable catalysts are, among others, Ziegler—Natta catalysts based on a transition metal, such as titanium, zirconium and/or vanadium catalysts. Especially Ziegler-Natta catalysts are useful as they can produce olefin polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The median particle size of the silica support can be typically from 10 to 100 μm. However, it has turned out that special advantages can be obtained if the support has median particle size from 5 to 30 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646.

Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used. If needed the activator may also include an external electron donor. Suitable electron donor compounds are disclosed in WO-A-95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR2 bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560,671, 4,581,342, 4,657,882, EP-A-45976, EP-A-45977 and EP-A-1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand.

Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

The polymerization catalyst used in the process of the present invention preferably is selected from a supported Ziegler-Natta catalyst and a supported metallocene catalyst.

Preferably the supported polymerization catalyst is selected from a silica-supported polymerization catalyst, a MgCl$_2$-supported polymerization catalyst, a silica/MgCl$_2$-supported polymerization catalyst or a self-supported polymerization catalyst.

It has been found that suitable catalyst descriptors for the process of the present invention are the catalyst skeletal density and the catalyst particle size.

It has been found that in the process according to the present invention stable operating conditions in the last polymerization stage can be obtained when the supported polymerization catalyst has a skeletal density above a certain lower limit.

Preferably, the skeletal density of the supported polymerization catalyst is higher than 1.3 g/ml, more preferably at least 1.4 g/ml and most preferably at least 1.5 g/ml.

Suitably the skeletal density of the supported polymerization catalyst is not higher than 3.0 g/ml, preferably not higher than 2.5 g/ml.

Figure 3:
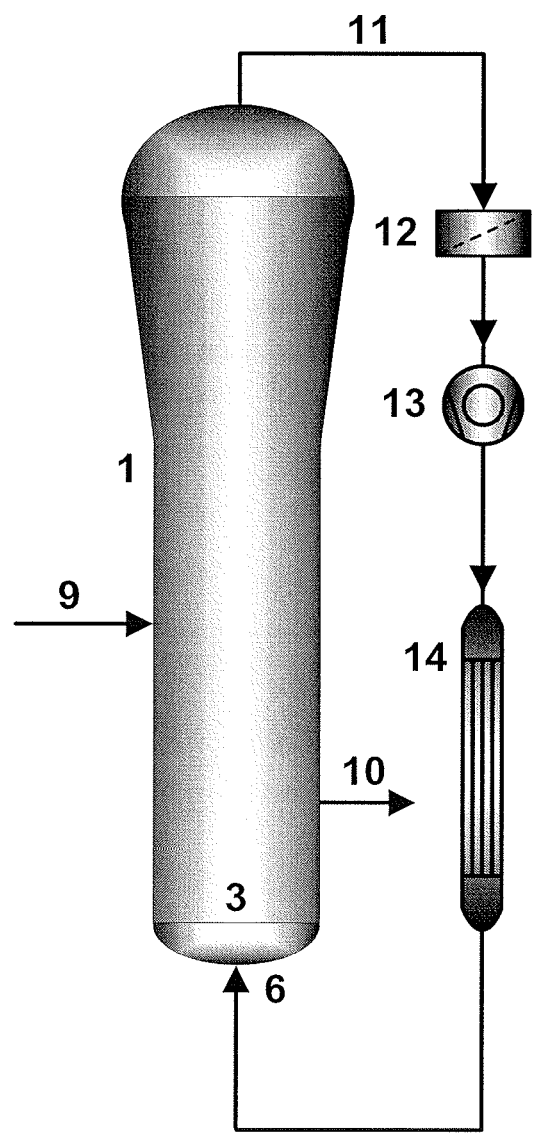
FIG. 3 shows a reactor assembly including a conventional fluidized bed reactor comprising a distribution plate and a disengaging zone.
Figure 4:
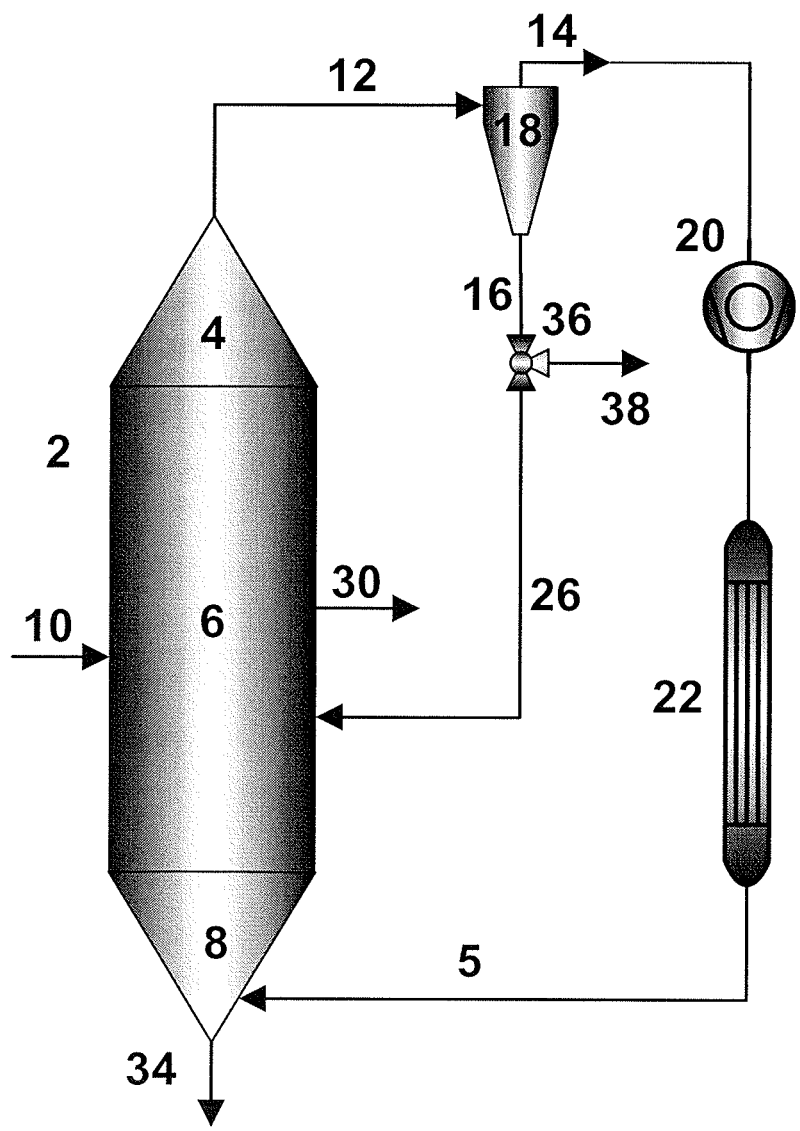
FIG. 4 shows a reactor assembly including a double cone fluidized bed reactor.

It has further been found that in the process according to the present invention stable operating conditions in the last polymerization stage can be achieved when the particle size and particle size distribution of the supported polymerization catalyst is carefully chosen. Thereby, it has been found that also the configuration of the gas phase reactor, i.e. a conventional fluidized bed reactor comprising a distribution plate and a disengaging zone as shown in FIG. 3 or a double cone reactor as shown in FIG. 4 have an influence on the particle size and particle size distribution of the supported polymerization catalyst.

Preferably, the median particle size $d_{50}$ of the supported polymerization catalyst is from 5 to 30 µm, more preferably from 6 to 28 µm and most preferably from 8 to 25 µm.

It is further preferred that the supported polymerization catalyst has a rather narrow span of the particle size distribution.

Preferably, the particle size distribution of the supported polymerization catalyst ($PSD_{cat}$) has a relative span of less than 1.6, more preferably of not more than 1.5, still more preferably of not more than 1.4 and most preferably not more than 1.3.

In certain cases the particle size distribution of the supported polymerization catalyst ($PSD_{cat}$) has a relative span of 0.

The relative span of the particle size distribution of the supported polymerization catalyst thereby follows the equation (I)

$$\text{span}_{cat} = (d_{90cat} - d_{10cat})/d_{50cat} \qquad (I)$$

whereby
- $\text{span}_{cat}$ is the relative span of the particle size distribution of the supported polymerization catalyst ($PSD_{cat}$);
- $d_{90cat}$ is the diameter of the particles of the supported polymerization catalyst at which 90% of the sample's mass is comprised of particles with a diameter less than this value in µm,
- $d_{50cat}$ is the diameter of the particles of the supported polymerization catalyst at which 50% of the sample's mass is comprised of particles with a diameter less than this value (median particle size) in µm, and
- $d_{10cat}$ is the diameter of the particles of the supported polymerization catalyst at which 10% of the sample's mass is comprised of particles with a diameter less than this value in µm.

Preferably, when using a fluidized bed reactor comprising a distribution plate and a disengaging zone in the last polymerization stage, the particle size distribution of the supported catalyst particles ($PSD_{cat}$), has a relative span following the inequation (II)

$$\text{span}_{cat} \leq 2.4 - 0.16 \cdot d_{50cat} + 0.0107 \cdot d_{50cat}^2 - 2.58 \cdot 10^{-4} \cdot d_{50cat}^3 \qquad (II)$$

whereby
- $\text{span}_{cat}$ is the relative span of the particle size distribution of the supported catalyst particles ($PSD_{cat}$);
- $d_{50cat}$ is the diameter of the particles of the supported polymerization catalyst at which 50% of the sample's mass is comprised of particles with a diameter less than this value (median particle size) in µm.

Alternatively, when using a double cone reactor in the last polymerization stage the particle size distribution of the supported catalyst particles ($PSD_{cat}$), preferably has a relative span following the inequation (III)

$$\text{span}_{cat} \leq 2.81 - 0.20 \cdot d_{50cat} + 0.0131 \cdot d_{50cat}^2 - 3.12 \cdot 10^{-4} \cdot d_{50cat}^3 \qquad (III)$$

whereby
- $\text{span}_{cat}$ is the relative span of the particle size distribution of the supported catalyst particles ($PSD_{cat}$);
- $d_{50cat}$ is the diameter of the particles of the supported polymerization catalyst at which 50% of the sample's mass is comprised of particles with a diameter less than this value (median particle size) in µm.

In FIG. 5, the relative span of the particle size distribution of the catalyst (i.e., $d_{90}-d_{10}/d_{50}$) which ensures good operability of the polymerization reactor with respect to median catalyst size ($d_{50}$) for two-stage loop/gas phase reactor configuration and single stage gas-phase reactor configurations is shown.

In FIG. 6, the relative span of the particle size distribution of the catalyst (i.e., $d_{90}-d_{10}/d_{50}$) which ensures good operability of the polymerization reactor with respect to median catalyst size ($d_{50}$) for two-stage loop/gas phase reactor configuration for a fluidized bed reactor comprising a distribution plate and a disengaging zone (dots) and a double cone reactor (dashed lines) is shown.

As it can be seen from the graphical representation of the correlation, the larger the median catalyst size the smaller the span of the catalyst size distribution should be in order to produce particles having particle size that will not cause operability challenges in the gas phase reactor of the last polymerization stage. In other words, the larger the broadness (span) of the initial catalyst particle size distribution the smaller the median particle size should be in order to avoid operability and performance issues in the gas phase reactor. Thereby the selection of the catalyst size features should be made taking into account the process specifications. When using a double cone reactor in the last polymerization stage a broader window of span of catalyst size distribution in relation to the median catalyst size is applicable for ensuring good operability than for a conventional fluidized bed reactor comprising a distribution plate and a disengaging zone.

It is well known in the art that the span of a supported polymerization catalyst can be manipulated by means of selecting supports with different particle sizes and particle size distributions.

It is further well known in the art that the span of a self-supported polymerization catalyst can be manipulated by controlling the parameters of its production method such as the stirrer speed or the ratio of the solvents used in the emulsion production process of the self-supported polymerization catalyst.

Multi-Stage Process

The present invention relates to a process for polymerizing ethylene or copolymerizing ethylene and at least one alpha-olefin comonomer with 3 to 12 carbon atoms in the presence of a supported polymerization catalyst in a multi-stage polymerization process in which at least two polymerization stages are connected in series and the last polymerization stage is conducted in a gas phase reactor to obtain an ethylene homo- or copolymer, wherein
in the first polymerization stage, which is not a pre-polymerization stage, the catalyst activity is at least 15 kg/$g_{catalyst}$/h; and
in each polymerization stage subsequent to said first polymerization stage the catalyst activity is not more than 75% of the catalyst activity in said first polymerization stage.

Preferably, the catalyst activity in the first polymerization stage, which is not a pre-polymerization stage, is at least 17 kg/$g_{catalyst}$/h, most preferably 20 kg/$g_{catalyst}$/h.

In FIG. 5 the consequences of a too high catalyst activity in each polymerization stage subsequent to said first polymerization stage are illustrated.

In FIG. 5, the relative span of the particle size distribution of the catalyst (i.e., $d_{90}$–$d_{10}$/$d_{50}$) which ensures good operability of the polymerization reactor with respect to median catalyst size ($d_{50}$) for two-stage loop/gas phase reactor configuration and single stage gas-phase reactor configurations is shown. The gas phase reactor is a conventional fluidized bed reactor comprising a distribution plate and a disengaging zone.

FIG. 5 shows the upper limits of the relative span of the particle size distribution of the catalyst (i.e., $d_{90}$–$d_{10}$/$d_{50}$) which ensures good operability of the polymerization reactor with respect to median catalyst size ($d_{50}$) for different catalyst activities in the reactor stages.

The filled squares show said upper limits for a single stage gas phase polymerization process with a catalyst activity of 20 Kg/get/h.

The open squares show said upper limits for a single stage gas phase polymerization process with a catalyst activity of 30 Kg/$g_{cat}$/h.

The filled circles show said upper limits for a two-stage loop/gas phase reactor configuration polymerization process with a catalyst activity of 20 Kg/$g_{cat}$/h in the loop reactor and 15 Kg/$g_{cat}$/h in the gas phase reactor. The catalyst activity in the gas phase reactor is 75% of the catalyst activity in the loop reactor.

The open circles show said upper limits for a two-stage loop/gas phase reactor configuration polymerization process with a catalyst activity of 30.4 Kg/get/h in the loop reactor and 22.5 Kg/$g_{cat}$/h in the gas phase reactor. The catalyst activity in the gas phase reactor is 74% of the catalyst activity in the loop reactor.

Catalysts with relative span in the area below the curve will ensure a smooth operability of the gas phase reactor. It can be seen that in the single stage process, the catalyst size characteristics window is broader compared to the two-stage process.

For two-stage processes in which the overall catalyst activity is rather high (open circles) the catalyst size characteristics window is even more narrow than for a two-stage process with a lower overall catalyst activity (filled circles).

In FIG. 6, the relative span of the particle size distribution of the catalyst (i.e., $d_{90}$–$d_{10}$/$d_{50}$) which ensures good operability of the polymerization reactor with respect to median catalyst size ($d_{50}$) for two-stage loop/gas phase reactor configurations using a conventional fluidized bed reactor comprising a distribution plate and a disengaging zone (filled dots) or a double cone reactor (dashed lines) is shown.

FIG. 6 shows the upper limits of the relative span of the particle size distribution of the catalyst (i.e., $d_{90}$–$d_{10}$/$d_{50}$) which ensures good operability of the polymerization reactor with respect to median catalyst size ($d_{50}$) for different catalyst activities in the reactor stages.

The black filled circles show said upper limits for a two-stage loop/gas phase reactor configuration polymerization process using a conventional fluidized bed reactor comprising a distribution plate and a disengaging zone with a catalyst activity of 20 Kg/$g_{cat}$/h in the loop reactor and 15 Kg/$g_{cat}$/h in the gas phase reactor. The catalyst activity in the gas phase reactor is 75% of the catalyst activity in the loop reactor.

The black filled squares show said upper limits for a two-stage loop/gas phase reactor configuration polymerization process using a conventional fluidized bed reactor comprising a distribution plate and a disengaging zone with a catalyst activity of 30.4 Kg/$g_{cat}$/h in the loop reactor and 22.5 Kg/$g_{cat}$/h in the gas phase reactor. The catalyst activity in the gas phase reactor is 74% of the catalyst activity in the loop reactor.

The black dashed line shows said upper limits for a two-stage loop/gas phase reactor configuration polymerization process using a double cone reactor with a catalyst activity of 20 Kg/$g_{cat}$/h in the loop reactor and 15 Kg/$g_{cat}$/h in the gas phase reactor.

The catalyst activity in the gas phase reactor is 75% of the catalyst activity in the loop reactor.

The black dot-and-dashed line show said upper limits for a two-stage loop/gas phase reactor configuration polymerization process using a double cone reactor with a catalyst activity of 30.4 Kg/$g_{cat}$/h in the loop reactor and 22.5 Kg/$g_{cat}$/h in the gas phase reactor. The catalyst activity in the gas phase reactor is 74% of the catalyst activity in the loop reactor.

It can be seen that the two-stage loop gas phase reactor configuration polymerization process using a double cone reactor has a broader window for catalyst size characteristics compared to the two-stage loop gas phase reactor configuration polymerization process using a conventional fluidized bed reactor comprising a distribution plate and a disengaging zone for ensuring good operability.

Usually, a multi-stage process is a process that makes use of at least two reactors, one for producing a lower molecular weight component and a second for producing a higher molecular weight component of the ethylene polymer. These reactors may be employed in parallel, in which case the components must be mixed after production.

More commonly, the reactors are employed in series, such that the products of one reactor are used as the starting material in the next reactor, e.g. one component is formed in the first reactor and the second is formed in the second reactor in the presence of the first component. In this way, the two components are more intimately mixed, since one is formed in the presence of the other.

The polymerization reactions used in each stage may involve conventional ethylene homo-polymerization or copolymerization reactions, e.g. gas phase, slurry phase, liquid phase polymerizations, using conventional reactors, e.g. loop reactors, gas phase reactors, batch reactors, etc.

The polymerization may be carried out continuously or batchwise, preferably the polymerization is carried out continuously.

The last polymerization stage of the process of the present invention is conducted in a gas phase reactor.

The polymerization stages previous to the last polymerization stage can be conducted in any selection of slurry reactors, liquid phase reactors and gas phase reactors.

A two-stage process according to the present invention can, for example be a slurry-gas phase or a gas phase-gas phase process, particularly preferably a slurry-gas phase process. Optionally the process according to the invention can comprise one or two additional polymerization steps.

The slurry and gas phase stages may be carried out using any conventional reactors known in the art. A slurry phase polymerization may, for example, be carried out in a continuously stirred tank reactor; a batch-wise operating stirred tank reactor or a loop reactor. Preferably slurry phase polymerization is carried out in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

The term gas phase reactor encompasses any mechanically mixed, fluidized bed reactor, horizontal gas-solids mixing reactor or settled bed reactor or gas phase reactors having two separate zones, for instance one fluidized bed combined with one settled bed zone. Preferably the gas phase reactor for the last polymerization stage is a fluidized bed reactor. Suitable fluidized bed reactors are a fluidized bed reactor comprising a distribution plate and a disengaging zone, e.g. as illustrated in the reactor assembly of FIG. 3, or a double cone reactor, e.g. as illustrated in the reactor assembly of FIG. 4.

The slurry and gas phase processes are well known and described in the prior art. Double cone reactor processes are described in EP2495037, EP2495038, EP2913346, EP2913345, EP2890490, EP 3103818.

The process of the present invention may include at least one, such as one or two polymerization stages which are conducted in one or more slurry phase reactor(s), such as loop reactor(s), followed by a gas-phase reactor.

The polymerization temperature in the slurry phase reactor(s) preferably is 70 to 115° C., more preferably is 75 to 105° C., and most preferably is 80 to 100° C., and the temperature in the gas-phase reactor preferably is 70 to 105° C., more preferably is 75 to 100° C., and most preferably is 82 to 97° C. The pressure in the slurry reactor is typically from 1 to 150 bar, preferably from 1 to 100 bar and the pressure in the gas phase reactor is typically at least 10 bar, preferably at least 15 bar but typically not more than 30 bar, preferably not more than 25 bar.

The polymerization in the slurry phase reactor usually takes place in an inert diluent, typically a hydrocarbon diluent which is selected from a group comprising $C_3$ to $C_8$ hydrocarbons, such as methane, ethane, propane, n-butane, isobutane, hexanes such as n-hexane, heptanes, octanes etc. or their mixtures. Preferably the diluent is a low boiling hydrocarbon having from 1 to 4 carbon atoms or a mixture of such hydrocarbons. An especially preferred diluent is propane, possibly containing minor amounts of methane, ethane and/or butane. The inert diluent can be the same or different in the different polymerization steps.

The ethylene content in the fluid phase of the slurry in the slurry phase reactor may be from 0.5 to 50% by mole, preferably from 1 to 20% by mole, and in particular from 2 to 10% by mole.

The polymerization process may further comprise a pre-polymerization step which precedes the polymerization steps. The purpose of the pre-polymerization is to polymerise a small amount of polymer onto the catalyst at a low temperature and/or a low monomer concentration. By pre-polymerization it is possible to improve the performance of the catalyst in slurry and/or modify the properties of the final polymer. The pre-polymerization step may be conducted in slurry or gas phase. Preferably the pre-polymerization is conducted in slurry.

Thus, the pre-polymerization step may be conducted in a loop reactor. The pre-polymerization is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low boiling hydrocarbon having from 1 to 4 carbon atoms or a mixture of such hydrocarbons. The most preferred diluent is propane.

The temperature in the pre-polymerization step is typically from 0° C. to 90° C., preferably from 20° C. to 80° C. and more preferably from 45° C. to 75° C.

The pressure is not critical and is typically from 1 bar to 150 bar, preferably from 10 bar to 100 bar.

The catalyst components are preferably all introduced to the pre-polymerization stage. However, where the solid catalyst component and the co-catalyst can be fed separately it is possible that only a part of co-catalyst is introduced into the pre-polymerization stage and the remaining part into the subsequent polymerization stages. Also in such cases it is necessary to introduce as much co-catalyst into the pre-polymerization stage as necessary to obtain a sufficient polymerization reaction.

In the case that the polymerization process does not comprise a pre-polymerization stage the catalyst components are suitably all introduced into the polymerization reactor of the first polymerization stage.

Suitable processes including polymerization and other process stages which could precede the polymerization process of the present invention are disclosed in WO-A-92/12182, WO-A-96/18662, EP-A-1415999, WO-A-98/58976, EP-A-887380, WO-A-98/58977, EP-A-1860125, GB-A-1580635, U.S. Pat. Nos. 4,582,816, 3,405,109, 3,324,093, EP-A-479186 and U.S. Pat. No. 5,391,654. As it is well understood by the person skilled in the art, the catalyst needs to remain active after the prior polymerization stages.

Last Polymerization Stage

The last polymerization stage of the process according to the present invention is conducted in a gas phase reactor.

In a preferred embodiment of a gas phase reactor, the polymerization takes place in a fluidised bed gas phase reactor where ethylene is polymerised in the presence of the polymerization catalyst in an upwards moving gas stream. In the fluidized bed the polymer particles, containing the active catalyst, come into contact with the reaction gases, such as monomer, comonomer(s) and hydrogen which cause polymer to be produced onto the particles.

Thereby, in one embodiment the fluidized bed reactor can comprise a distribution plate which is situated below the fluidized bed thereby separating the bottom zone and the middle zone of the reactor. The upper limit of the fluidized bed is usually defined by a disengaging zone in which due to its expanding diameter compared to the middle zone the fluidization gas expands and the gas disengages from the polyolefin powder. Fluidized bed reactors with disengaging zone and distribution plate are well known in the art and are illustrated in the reactor assembly of FIG. 3.

In another embodiment the fluidized bed reactor is a so-called double cone reactor, i.e. a fluidized bed reactor having a top zone of a generally conical shape as such that the equivalent cross-sectional diameter is monotonically decreasing with respect to the flow direction of the fluidization gas, a middle zone in direct contact with and below said top zone of a generally cylindrical shape and a bottom zone in direct contact and below said middle zone of a generally conical shape as such that the equivalent cross-sectional diameter is monotonically increasing with respect to the flow direction of the fluidization gas illustrated in the reactor assembly of FIG. 4.

The bottom zone forms the lower part of the reactor in which the base of the fluidized bed is formed. The base of the bed forms in the bottom zone with typically no gas distribution grid, fluidization grid, or gas distribution plate, being present.

Above the bottom zone and in direct contact with it is the middle zone. The middle zone and the upper part of the bottom zone contain the fluidized bed. Because there is typically no fluidization grid there is a free exchange of gas and particles between the different regions within the bottom zone and between the bottom zone and the middle zone. Finally, above the middle zone and in direct contact therewith is the top zone.

The bottom zone of the reactor has a generally conical shape tapering downwards. Because of the shape of the zone, the gas velocity gradually decreases along the height within said bottom zone. The gas velocity in the lowest part is greater than the transport velocity and the particles eventually contained in the gas are transported upwards with the gas. At a certain height within the bottom zone the gas velocity becomes smaller than the transport velocity and a fluidized bed starts to form. When the gas velocity becomes still smaller the bed becomes denser and the polymer particles distribute the gas over the whole cross-section of the bed. Preferably, the equivalent cross-sectional diameter of the bottom zone is monotonically increasing with respect to the flow direction of the fluidization gas through the fluidized bed reactor. As the flow direction of the fluidization gas is upwards with respect to the base, the equivalent cross-sectional diameter of the bottom zone is vertically monotonically increasing.

The middle zone of the fluidized bed reactor has a generally cylindrical shape. Preferably it will be in the form of a straight circular cylinder being denoted herein simply cylinder. From a more functional perspective, the middle zone will essentially form a domain wherein the superficial velocity of the fluidization gas is essentially constant. The middle zone typically contains most of the fluidized bed. While the bed extends also to the bottom and top zones, its major part is within the middle zone.

The gas velocity within the middle zone is such that an effective circulation of solids is achieved. This leads to good heat and mass transfer within the bed, which reduce the risk of chunk formation and fouling. Especially, good powder flow near the walls of the reactor has been found to reduce the adhesion of polymer at the wall of the reactor. Suitably the superficial velocity of the fluidization gas is within the range of from 0.45 to 1.0 m/s. The process of the present invention is especially useful when the superficial velocity of the fluidization gas is within the range of from 0.45 to 0.9 m/s, preferably from 0.50 to 0.90 m/s, especially preferably from 0.55 to 0.90 m/s and in particular from 0.60 to 0.90 m/s.

The top zone of the reactor is shaped such that a gas-particle stream vicinal to the inner walls is created, whereby the gas-particle stream is directed downwards to the base. This gas-particle stream leads to an excellent particle-gas distribution and to an excellent heat transfer. Further the high velocity of the gas and particles vicinal to the inner walls minimizes lump- and sheet formation. The top zone has a generally conical, upwards tapering shape. minimizes lump- and sheet formation. The top zone has a generally conical, upwards tapering shape. It is particularly preferred that the cone forming the top zone is a straight circular cone and the cylinder forming the middle zone preferably is a circular cylinder. The specific cone-angles of the cone-shaped upper zone further improve the tendency for backflow of the particles counter current to the fluidization gas. The resulting unique pressure balance leads to an intensive break up of bubbles, whereby the space-time-yield and solids concentration are further increased. Further as mentioned above, the wall flow velocity, i.e., the velocity of particles and gas vicinal to the inner walls is high enough to avoid the formation of lumps and sheets.

In a gas phase reactor the upwards moving gas stream is established by withdrawing a fluidization gas stream from the top zone of the reactor, typically at the highest location. The fluidization gas stream withdrawn from the reactor is then usually compressed and cooled and re-introduced to the bottom zone of the reactor.

Preferably, the gas is filtered before being passed to the compressor. Additional monomer, eventual comonomer(s), hydrogen and inert gas are suitably introduced into the circulation gas line. It is preferred to analyze the composition of the circulation gas, for instance, by using on-line gas chromatography and adjust the addition of the gas components so that their contents are maintained at desired levels.

As discussed above and shown in the example section, the selection of the catalysts with a particle size distribution results in ethylene polymer particles in the last polymerization stage which have a favorable particle size distribution which allows smooth operation of the gas phase reactor.

When carefully selecting the particle size of the supported catalyst particles the relative span of the particle size distribution of the polymer particles in the last polymerization stage ($PSD_{PE}$) is within the range of from 0.1 to 1.8, more preferably within the range of from 0.2 to 1.7 and most preferably within the range of from 0.5 to 1.5.

It is preferred that the particle size $d_{90}$ of the ethylene homo- or copolymer, ($d_{90PE}$), being the diameter of the ethylene homo- or copolymer particles in the last polymerization stage at which 90% of the sample's mass is comprised of particles with a diameter less than this value in μm, in the last polymerization stage, is within the range of from 300 μm to 1500 μm, more preferably in the range of 400 μm to 1400 μm, and most preferably in the range of from 400 μm to 1350 μm.

It is further preferred that the particle size $d_{50}$ of the ethylene homo- or copolymer, ($d_{50PE}$), being the diameter of the ethylene homo- or copolymer particles in the last polymerization stage at which 50% of the sample's mass is comprised of particles with a diameter less than this value in μm, in the last polymerization stage, is within the range of from 100 μm to 1200 μm, more preferably in the range of 200 μm to 1100 μm, and most preferably in the range of from 300 μm to 1000 μm.

It is still further preferred that the particle size $d_{10}$ of the ethylene homo- or copolymer, ($d_{10PE}$), being the diameter of the ethylene homo- or copolymer particles in the last polymerization stage at which 10% of the sample's mass is comprised of particles with a diameter less than this value in μm, in the last polymerization stage, is within the range of from 50 μm to 1000 μm, more preferably in the range of 75 μm to 800 μm, and most preferably in the range of from 100 μm to 600 μm.

Use

The present invention further relates to the use of the process according to the invention as defined above or below for reducing particle carry-over in the last polymerization stage.

Thereby, it is preferred that the process according to the invention as defined above or below is used for reducing agglomeration of polymer particles in the last polymerization stage.

It is further preferred that the process according to the invention as defined above or below is used for reducing overheating of the polymer particles in the last polymerization stage.

Still further, the present invention relates to the use of a supported polymerization catalyst having an median particle size $d_{50cat}$ of from 5 to 30 μm in a multi-stage polymerization process in which at least two polymerization stages are connected in series and the last polymerization stage is conducted in a fluidized bed reactor comprising a distribution plate and a disengaging zone wherein in the first polymerization stage, which is not a prepolymerization stage, the catalyst activity is at least 15 kg/g$_{catalyst}$/h;

in each polymerization stage subsequent to said first polymerization stage the catalyst activity is not more than 75% of the catalyst activity in said first polymerization stage; and the particle size distribution of the supported catalyst particles (PSD$_{cat}$) has a relative span following the inequation (II)

$$\text{span}_{cat} \leq 2.4 - 0.16 \cdot d_{50cat} + 0.0107 \cdot d_{50cat}^2 - 2.58 \cdot 10^{-4} \cdot d_{50cat}^3 \quad (II)$$

whereby span$_{cat}$ is the relative span of the particle size distribution of the supported catalyst particles (PSD$_{cat}$)

$d_{50cat}$ is the is the diameter of the particles of the supported polymerization catalyst at which 50% of the sample's mass is comprised of particles with a diameter less than this value (median particle size) in μm, to polymerize an ethylene homo- or copolymer.

Alternatively, the present invention relates to the use of a supported polymerization catalyst having an median particle size $d_{50cat}$ of from 5 to 30 μm in a multi-stage polymerization process in which at least two polymerization stages are connected in series and the last polymerization stage is conducted in a double cone reactor wherein in the first polymerization stage, which is not a prepolymerization stage, the catalyst activity is at least 15 kg/g$_{catalyst}$/h;

in each polymerization stage subsequent to said first polymerization stage the catalyst activity is not more than 75% of the catalyst activity in said first polymerization stage; and the particle size distribution of the supported catalyst particles (PSD$_{cat}$) has a relative span following the inequation (II)

$$\text{span}_{cat} \leq 2.81 - 0.20 \cdot d_{50cat} + 0.0131 \cdot d_{50cat}^2 - 3.12 \cdot 10^{-4} \cdot d_{50cat}^3 \quad (III)$$

whereby span$_{cat}$ is the relative span of the particle size distribution of the supported catalyst particles (PSD$_{cat}$);

$d_{50cat}$ is the diameter of the particles of the supported polymerization catalyst at which 50% of the sample's mass is comprised of particles with a diameter less than this value (median particle size) in μm, for polymerizing an ethylene homo- or copolymer.

Thereby, the process and the supported polymerization catalyst are preferably defined as described above or below.

EXAMPLES

1. Measurement Methods a) Measurement of the Skeletal Catalyst Density

Principle:

In the present measurement catalyst skeletal density is measured as the difference of the masses of a dry catalyst sample under current conditions and after filling the pores with n-heptane.

Analysis:

Firstly, the density of n-heptane under current conditions is measured by taring a 10 ml bottle and filling the bottle with a pre-determined volume of dry n-heptane. The weight of the n-heptane is measured and the density of the n-heptane is calculated as density=mass/volume.

In a second step, the weight of a new dry clean bottle is measured. Around 2 g catalyst is added into the bottle, and the weight of the catalyst is measured accurately using a high precision balance placed in a glove box.

A bottle which contains the catalyst sample is placed in a vacuum impregnator in the glove box. A tube is inserted into the cap of the bottle and a vacuum is applied.

Vacuum is applied on the bottle such that a pressure of 150 mbar is obtained within 30 seconds. Pressure of 150 mbar is maintained for 5 min. While maintaining the vacuum on the bottle, then n-heptane is carefully introduced into the bottle by opening the valve in order to cover the catalyst sample fully with n-heptane.

Afterwards, the valve is closed to prevent further n-heptane influx and the vacuum is turned off.

The bottle is filled to a pre-determined mark with n-heptane. The weight of the filled bottle is measured and then the catalyst density is calculated.

b) BET Surface Area

The BET surface area is measured according to DIN 66131/2 with nitrogen (N2).

2. Catalysts

The following catalysts, namely, 1, 2, 3, 4 and 5 were used to verify the validity of the proposed experimental method for determining the catalyst density:

Catalyst 1:

Catalyst 1 is a MgCl$_2$-supported Ziegler-Natta catalyst described in EP 591 224, EP 491 566 and EP 586 390.

Catalyst 2:

Catalyst 2 is a self-supported Ziegler-Natta catalyst described in WO 2004/029112.

Catalyst 3:

Catalyst 3 is a self-supported Ziegler-Natta catalyst described in WO 2012/007430A1.

Catalyst 4:

Catalyst 4 is a supported Ziegler-Natta catalyst described in EP 1 090 048.

Catalyst 5:

Catalyst 5 is a silica-supported Ziegler-Natta catalyst described in the example 1 of EP 1 378 528.

Catalyst 6:

Catalyst 6 is a silica-based single-site catalyst comprising [Bis(1-butyl-3-methyl)-cyclopentadienyl] zirconium dichloride as metallocene component and methyl aluminoxane as cocatalyst. The catalyst is prepared as disclosed in WO-A-95/12622.

3. Measurement of Skeletal Density of Different Catalysts

1. Comparing Skeletal Densities and BET Surface Area of Catalysts Having a Similar Type of Internal Donor.

The skeletal densities and BET surface areas of catalysts 1 and 2 have been determined as described above and listed in Tables 1 and 2. Catalysts 1 and 2 have the same type of internal donor.

TABLE 1

Skeletal densities of catalysts 1 and 2.

| | Skeletal density [g/ml] |
|---|---|
| Catalyst 1 | 1.94 ± 0.04 |
| Catalyst 2 | 1.61 ± 0.04 |

It can be seen that for catalysts such as Catalysts 1 and 2 different skeletal densities can be measured. The BET surface area has been determined for catalysts 1 and 2 under different BET sample preparation conditions. The first sample of Catalyst 1 was prepared at room temperature under vacuum. The second sample of Catalyst 1 was prepared at 100° C. under vacuum overnight. The third sample of Catalyst 1 was prepared without any pretreatment.

The first sample of Catalyst 2 was prepared at 100° C. under vacuum overnight. The second sample of Catalyst 2 was prepared without any pretreatment.

TABLE 2

BET surface areas of catalysts 1 and 2.

| | BET surface area [m$^2$/g] | Average pore diameter [Å] |
|---|---|---|
| Catalyst 1 | | |
| RT/Vacc | 275 | 70 |
| 100° C./Vacc/overnight | 238 | 78 |
| No pretreatment | 286 | 60 |
| Catalyst 2 | | |
| 100° C./Vacc/overnight | Not detectable | Not detectable |
| No pretreatment | Not detectable | Not detectable |

Based on the BET measurements, it can be seen that the skeletal density of catalysts cannot be estimated. For instance, Catalyst 2 shows no detectable BET surface area and pore diameter (see Table 2) but a rather high skeletal density (see Table 1). Moreover, the skeletal density of Catalyst 1 in comparison to the corresponding skeletal density value of Catalyst 2 is only 20% higher; however, according to BET measurements, Catalyst 1 shows a rather high BET surface and pore diameter.

2. Comparing Skeletal Density and Morphology of Different Catalyst Batches Subjected to Recipe Modifications of the Same Type of Catalyst Table 3 shows the skeletal densities of two batches of Catalyst 3.

TABLE 3

Skeletal densities of different batches of Catalyst 3.

| | d$_{50cat}$ [μm] | Skeletal density [g/ml] |
|---|---|---|
| Cat 3, batch a | 39 | 1.51 ± 0.04 |
| Cat 3 + batch b | 36 | 1.68 ± 0.02 |

Figure 1:
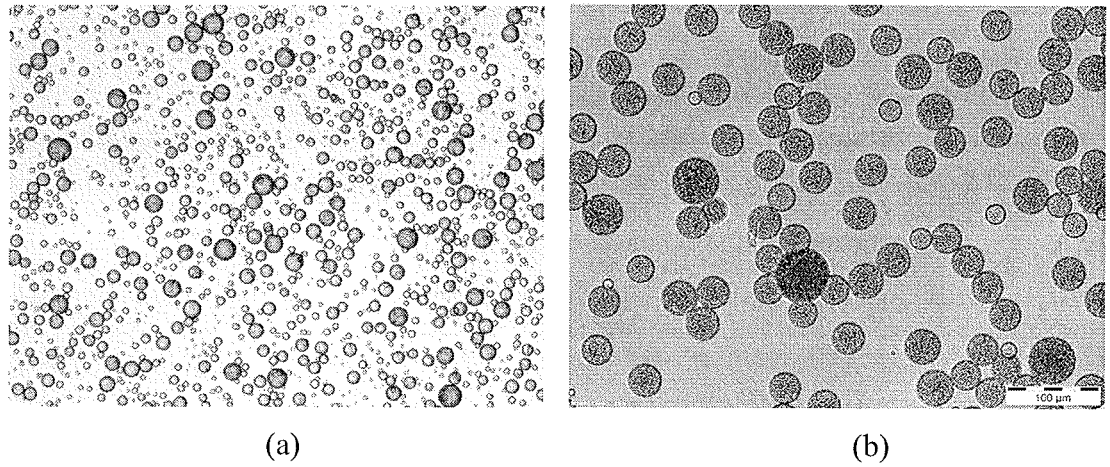
FIGS. 1a and 1b show light microscopic images of particles of two batches of catalyst 3 (i.e. catalyst batch a, and catalyst batch b) which were subjected to different recipe modifications.

In FIGS. 1a and 1b the light microscopic images of the catalyst batches a and b are shown. Although no morphological differences can be detected either in the light microscope images or in the particle size of these two catalyst batches of Catalyst 3, catalyst batch b has a significantly higher skeletal density compared to catalyst batch a.

Table 4 shows the skeletal densities of two additional batches of Catalyst 3 which have been subjected to different recipe modifications.

TABLE 4

Skeletal densities of different batches of Catalyst 3.

| | d$_{50cat}$ [μm] | Skeletal density [g/ml] | Bulk density [g/ml] |
|---|---|---|---|
| Catalyst 3, batch c | 30 | 1.66 | 0.81 |
| Catalyst 3, batch d | 47 | 1.81 | 0.82 |

Figure 2:
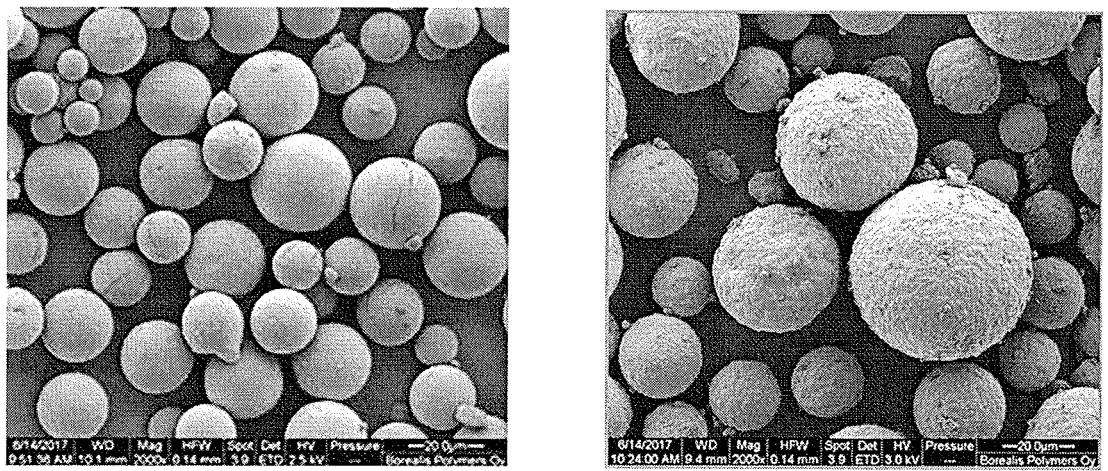
FIGS. 2a and 2b show SEM images of particles of another two batches of catalyst 3 (i.e. catalyst batch c and catalyst batch d) which were subjected to different recipe modifications.

In FIGS. 2a and 2b the SEM images of catalyst batches c and d, which were subjected to different recipe modifications of Catalyst 3 are shown. SEM images of catalyst batches c and d indicate perfectly spherical particle morphology for both catalyst batches. However, catalyst batch c shows higher skeletal density compared to catalyst batch d. The bulk density as well as the particle size of those catalyst batches are comparable.

4. Overview of Suitable Multi-Stage Polymerization Processes Illustrated in FIGS. 3 and 4

FIG. 3 shows an example embodiment of a multi-stage process which comprises as a last polymerization stage a reactor system comprising a conventional fluidized bed reactor (1) in which gas(es) enters via the distribution plate (3). The catalyst, which is dispersed within polymer particles from a preceding polymerization stage, enters the fluidized bed reactor (1) through a separate inlet (9) at the side wall at the height of the reaction zone of the fluidized bed reactor. The fluidized bed reactor (1) is of cylindrical shape. Monomer, optionally comonomer, certain catalyst components and/or chain growth controller or chain transfer agent and/or fluidization gas enter the fluidized bed reactor (1) through inlet (6) at the lower part of the fluidized bed reactor (1) thereby forming the reaction gas. These streams can also be introduced to the fluidized bed reactor (1) through separate inlets (6) at the lower end of the fluidized bed reactor (1) (not shown in FIG. 3). In the fluidized bed reactor (1) a fluidized bed of catalytic particles is generated and maintained in the reaction zone on which particles further polymer is formed due to the polymerization reaction. At the top of the fluidized bed reactor (1) the polymer particles are separated from the gas in a disengaging zone. The gas(es) leaves the fluidized bed reactor (1) through gas outlet (11) at the upper end of the fluidized bed reactor (1). The gas(es) can be separated from optional polymer particles in solids filter (12), repressurized (13), cooled (14), optionally recycled and then recirculated to gas inlet (6) of the fluidized bed reactor (1).

FIG. 4 shows an example embodiment of a multi-stage process which comprises as a last polymerization stage a reactor system comprising a double cone reactor (2), which has a bottom zone (8), a middle zone (6) and a top zone (4). The fluidisation gas is introduced into the bottom zone (8) through a line (5) obtained from cyclone (18). While the gas flows upwards through the bottom zone (8) its superficial velocity reduces due to the increasing diameter. A fluidized bed starts to form within the bottom zone (8). The gas continues to travel upwards through the middle zone (6) where the gas velocity is constant and the bed is fully formed. Finally, the gas reaches the top zone (4) from where together with entrained solids, passes along line as a stream

(12) to the post reactor treatment. In a suitable embodiment of the post reactor treatment as illustrated in FIG. 4 stream (12) is introduced to at least one cyclone (18). The cyclone(s) (18) removes all the entrained solids from the circulation gas which is recovered and it passed through the gas outlet line (14) and directed optionally to a compressor (20) and then optionally to a cooler (22) and form the cooler the gas is introduced to the double cone reactor (2) via the gas inlet (5). The recovered polymer particles in the cyclone (18) passed through the line (16) to a three way valve (36) and then, part of the particulate matter is withdrawn through the outlet line (36) and the remaining part is fed/introduced into the reactor (2) through the line (26).

The polymer product is withdrawn from the reactor (2) along one or more outlets (30) as second line for withdrawing olefin polymer product stream. Catalyst, which is dispersed within polymer particles from a preceding polymerization stage, is introduced into the reactor (2) along line (10). Agglomerates are removed though outlet (34).

5. Polymerization of Bimodal Polyethylene Pipe Grades in Multi-Stage Process Using Catalysts with Different Skeletal Densities In the following bimodal polyethylene resins, suitable for pipe applications, are polymerized in a multi-stage process comprising a prepolymerization stage in a slurry prepolymerization reactor, followed by a homopolymerization stage in a loop reactor and a copolymerization stage with 1-hexene in a fluidized bed gas phase reactor comprising a distribution plate and a disengaging zone. As polymerization catalysts catalyst 4 and 5 are used. The reactors configuration as well as the polymerization conditions are the same in all examples. The examples differ in the particle size and skeletal densities of catalysts 4 and 5.

Example 1 (Inventive)

In the first example, particles of catalyst 4 having a skeletal density equal to 2.2 kg/m$^3$, exhibiting mean average activity in prepolymerization and loop reactors equal to 2 kg/g$_{cat}$/h and 23 kg/g$_{cat}$/h, having also size distribution of $d_{10}$=5 μm, $d_{50}$=10 μm and $d_{90}$=15 μm was used to produce a pipe grade. The mean residence time in the prepolymerization and loop reactors were 0.5 h and 1 h, respectively. The particle size distribution of the particles entering the gas phase reactor was $d_{10}$=195 μm, $d_{50}$=390 μm and $d_{90}$=585 μm and no operability issues related to particle carry over was observed (see Table 5). The catalyst activity in the gas phase reactor was 14.5 Kg/g$_{cat}$/h.

TABLE 5

Key size-related features of catalyst and polymer particles and GPR performance.

| Feature | Value |
| --- | --- |
| Catalyst $d_{10}$ [μm] | 5 |
| Catalyst $d_{50}$ [μm] | 10 |
| Catalyst $d_{90}$ [μm] | 15 |
| Polymer $d_{10}$ entering GPR [μm] | 195 |
| Polymer $d_{50}$ entering GPR [μm] | 390 |
| Polymer $d_{90}$ entering GPR [μm] | 585 |
| Superficial gas velocity [m/s] | 0.4 |
| Solids carry over | No |
| Chunking and Sheeting | No |
| Segregation/poor mixing | No |

Example 2 (Inventive)

In Example 2, the polymerization series described in Example 1 was repeated with particles of catalyst 4 having a skeletal density equal to 1.5 kg/m$^3$. The particle size distribution of the particles entering the gas phase reactor was $d_{10}$=172 μm, $d_{50}$=343 μm and $d_{90}$=515 μm and no severe operability issues related to particle carry over was observed (see Table 6). It has to be mentioned that the catalyst activity in the gas phase reactor was 13.7 Kg/g$_{cat}$/h.

TABLE 6

Key size-related features of catalyst and polymer particles and GPR performance.

| Feature | Value |
| --- | --- |
| Catalyst $d_{10}$ [μm] | 5 |
| Catalyst $d_{50}$ | 10 |
| Catalyst $d_{90}$ [μm] | 15 |
| Polymer $d_{10}$ entering GPR [μm] | 172 |
| Polymer $d_{50}$ entering GPR [μm] | 343 |
| Polymer $d_{90}$ entering GPR [μm] | 515 |
| Superficial gas velocity [m/s] | 0.4 |
| Solids carry over | No |
| Chunking and Sheeting | No |
| Segregation/poor mixing | No |

Example 3 (Inventive)

Particles of catalyst 5 having a skeletal density equal to 2.2 kg/m$^3$ and exhibiting mean average activity in prepolymerization and loop reactors equal to 2 kg/g$_{cat}$/h and 12 kg/g$_{cat}$/h, having also size distribution of $d_{10}$=10 μm, $d_{50}$=25 μm and $d_{90}$=35 μm was used to produce a pipe grade. The mean residence time in the prepolymerization and loop reactors were 0.5 h and 1 h, respectively. The particle size distribution of the particles entering the gas phase reactor was $d_{10}$=320 μm, $d_{50}$=805 μm and $d_{90}$=1125 μm and no operability issues related to particle carry over was observed (see Table 7). It has to be mentioned that the catalyst activity in the gas phase reactor was 7.1 Kg/g$_{cat}$/h.

TABLE 7

Key size-related features of catalyst and polymer particles and GPR performance.

| Feature | Value |
| --- | --- |
| Catalyst $d_{10}$ [μm] | 10 |
| Catalyst $d_{50}$ [μm] | 25 |
| Catalyst $d_{90}$ [μm] | 35 |
| Polymer $d_{10}$ entering GPR [μm] | 320 |
| Polymer $d_{50}$ entering GPR [μm] | 805 |
| Polymer $d_{90}$ entering GPR [μm] | 1125 |
| Superficial gas velocity [m/s] | 0.4 |
| Solids carry over | No |
| Chunking and Sheeting | No |
| Segregation/poor mixing | No |

Example 4 (Inventive)

In Example 4, the polymerization series described in Example 3 was repeated with particles of catalyst 5 having a skeletal density equal to 1.5 kg/m$^3$. The particle size distribution of the particles entering the gas phase reactor was $d_{10}$=283 μm, $d_{50}$=708 μm and $d_{90}$=990 μm and no operability issues related to particle carry over was observed (see Table 8). The catalyst activity in the gas phase reactor was 6.5 Kg/g$_{cat}$/h.

TABLE 8

Key size-related features of catalyst and
polymer particles and GPR performance.

| Feature | Value |
| --- | --- |
| Catalyst $d_{10}$ [μm] | 10 |
| Catalyst $d_{50}$ [μm] | 25 |
| Catalyst $d_{90}$ [μm] | 35 |
| Polymer $d_{10}$ entering GPR [μm] | 283 |
| Polymer $d_{50}$ entering GPR [μm] | 708 |
| Polymer $d_{90}$ entering GPR [μm] | 990 |
| Superficial gas velocity [m/s] | 0.4 |
| Solids carry over | No |
| Chunking and Sheeting | No |
| Segregation/poor mixing | No |

Example 5 (Comparative)

In Example 5, the polymerization series described in Example 2 was repeated with catalyst particles having a skeletal density value equal to 1.3 kg/m³. It is obvious that by having such a low catalyst skeletal density value compared to catalyst skeletal density of Example 2 severe operability issues are manifested in gas phase reactor (see Table 9). It can be concluded that in this case the tendency of solids entrainment is substantially higher compared to the case where the catalyst skeletal density value is above the established threshold. The catalyst activity in the gas phase reactor was 11.5 Kg/$g_{cat}$/h.

TABLE 9

Key size-related features of catalyst and
polymer particles and GPR performance.

| Feature | Value |
| --- | --- |
| Catalyst $d_{10}$ [μm] | 5 |
| Catalyst $d_{50}$ [μm] | 10 |
| Catalyst $d_{90}$ [μm] | 15 |
| Polymer $d_{10}$ entering GPR [μm] | 50 |
| Polymer $d_{50}$ entering GPR [μm] | 98 |
| Polymer $d_{90}$ entering GPR [μm] | 165 |
| Superficial gas velocity [m/s] | 0.4 |
| Solids carry over | Yes |
| Chunking and Sheeting | Yes |
| Segregation/poor mixing | Yes |

Example 6 (Comparative)

In Example 6, the polymerization series described in Example 4 was repeated with catalyst particles having a skeletal density value equal to 1.3 Kg/m³. It is obvious that by having such a low catalyst skeletal density value compared to catalyst skeletal density of Example 4 severe operability issues are manifested in the gas phase reactor (see Table 10). It can be concluded that in this case the tendency of solids entrainment is substantially higher compared to the case where the catalyst skeletal density value is above the established threshold. The catalyst activity in the gas phase reactor was 5.8 Kg/$g_{cat}$/h.

TABLE 10

Key size-related features of catalyst and
polymer particles and GPR performance.

| Feature | Value |
| --- | --- |
| Catalyst $d_{10}$ [μm] | 10 |
| Catalyst $d_{50}$ [μm] | 25 |
| Catalyst $d_{90}$ [μm] | 35 |
| Polymer $d_{10}$ entering GPR [μm] | 82 |
| Polymer $d_{50}$ entering GPR [μm] | 190 |
| Polymer $d_{90}$ entering GPR [μm] | 270 |
| Superficial gas velocity [m/s] | 0.4 |
| Solids carry over | Yes |
| Chunking and Sheeting | Yes |
| Segregation/poor mixing | Yes |

From the above examples it can be seen that the skeletal density of the catalyst particles should be more than 1.3 g/ml in order to ensure stable polymerization conditions in the gas phase reactor of the last polymerization stage.

6. Polymerization of Bimodal Polyethylene Pipe Grades in Multi-Stage Process with a Fluidized Bed Gas Phase Reactor Comprising a Distribution Plate and a Disengaging Zone Using Catalysts with Different Particle Sizes and Spans of the Particle Size Distribution In the following bimodal polyethylene resins suitable for pipe applications are polymerized in a multi-stage process comprising a homopolymerization stage in a loop reactor and a copolymerization stage with 1-hexene in a fluidized bed gas phase reactor comprising a distribution plate and a disengaging zone. As polymerization catalyst catalyst 4 is used. The reactor set up and polymerization conditions are kept constant in all examples. The examples differ in the particle size and spans of the particle size distribution of catalyst 4. The particle size and spans of the particle size distribution of catalyst 4 can be amended by using different supports having different particle size and spans of the particle size distribution when preparing catalyst 4.

Example 7 (Comparative)

In the first example, particles of catalyst 4 exhibiting mean average activity in loop and gas phase reactor conditions equal to 20 kg/$g_{cat}$/h and 12 kg/$g_{cat}$/h, having also mean size equal to $d_{50}$=25 μm and span equal to 1.6 was used to produce a pipe grade. The mean residence time in the loop reactor was 1 h and in gas phase reactor 2 h. The particle size distribution in the gas phase reactor was very broad (i.e., span=1.8) and severe operability issues related to both particle carry over and particle overheating was observed (see Table 11).

TABLE 11

Key size-related features of catalyst and
polymer particles and GPR performance.

| Feature | Value |
| --- | --- |
| Catalyst $d_{50}$ [μm] | 25 |
| Catalyst Span | 1.6 |
| Polymer $d_{50}$ in GPR [μm] | 950 |
| Polymer $d_{10}$ in GPR [μm] | 190 |
| Polymer $d_{90}$ in GPR [μm] | 1850 |
| Polymer Span | 1.8 |
| Superficial gas velocity [m/s] | 0.4 |
| Solids carry over | Significant |
| Chunking and Sheeting | Significant |
| Segregation/poor mixing | Yes |

Example 8 (Inventive)

In Example 8, the polymerization series described in Example 7 was repeated with a catalyst particle size distribution (PSD) features as described by the correlation of formula (II) (see FIG. 5). It is obvious that by selecting the catalyst span proposed in the correlation of formula (II), less operability issues are manifested in gas phase reactor (see Table 12). It can be concluded that in this case the tendency of particle overheating and the solids entrainment rate are substantially lower compared to the case where a catalyst PSD was selected to be out of the proposed range described in FIG. 5.

TABLE 12

Key size-related features of catalyst and polymer particles and GPR performance.

| Feature | Value |
| --- | --- |
| Catalyst $d_{50}$ [μm] | 25 |
| Catalyst Span | 0.8 |
| Polymer $d_{50}$ in GPR [μm] | 950 |
| Polymer $d_{10}$ in GPR [μm] | 520 |
| Polymer $d_{90}$ in GPR [μm] | 1350 |
| Polymer Span | 0.88 |
| Superficial gas velocity [m/s] | 0.4 |
| Solids carry over | Negligible |
| Chunking and Sheeting | Not Observed |
| Segregation/poor mixing | No |

Example 9 (Comparative)

Particles of catalyst 4 exhibiting mean average activity in loop and gas phase reactor conditions equal to 20 kg/$g_{cat}$/h and 12 kg/$g_{cat}$/h, having mean size equal to $d_{50}$=15 μm (smaller carrier) and span equal to 1.6 was used to produce a pipe grade. The mean residence time in the loop reactor was 1 h and in the gas phase reactor 2 h. The particle size distribution in the gas phase reactor was very broad (i.e., span=2.03) and severe operability issues related to poor mixing, particle segregation and particle overheating were observed (see Table 13).

TABLE 13

Key size-related features of catalyst and polymer particles and GPR performance.

| Feature | Value |
| --- | --- |
| Catalyst $d_{50}$ [μm] | 15 |
| Catalyst Span | 1.6 |
| Polymer $d_{50}$ in GPR [μm] | 550 |
| Polymer $d_{10}$ in GPR [μm] | 180 |
| Polymer $d_{90}$ in GPR [μm] | 1300 |
| Polymer Span | 2.03 |
| Superficial gas velocity [m/s] | 0.4 |
| Solids carry over | Significant |
| Chunking and Sheeting | Significant |
| Segregation/poor mixing | Yes |

Example 10 (Inventive)

In Example 10, the polymerization series described in Example 9 was repeated with a catalyst particle size distribution (PSD) features as described by the correlation (II) (see FIG. 5). It is obvious that by selecting the catalyst span proposed in the correlation, less operability issues are manifested in the gas phase reactor (see Table 14). It can be concluded that in this case the tendency of solids segregation and solids entrainment is substantially lower compared to the case where a catalyst PSD was selected to be out of the proposed range described in FIG. 5.

TABLE 14

Key size-related features of catalyst and polymer particles and GPR performance.

| Feature | Value |
| --- | --- |
| Catalyst $d_{50}$ [μm] | 15 |
| Catalyst Span | 1.2 |
| Polymer $d_{50}$ in GPR [μm] | 550 |
| Polymer $d_{10}$ in GPR [μm] | 290 |
| Polymer $d_{90}$ in GPR [μm] | 1100 |
| Polymer Span | 1.47 |
| Superficial gas velocity [m/s] | 0.4 |
| Solids carry over | Negligible |
| Chunking and Sheeting | Not Observed |
| Segregation/poor mixing | No |

7. Polymerization of Bimodal Polyethylene Pipe Grades in Multi-Stage Process with a Double Cone Reactor Using Catalysts with Different Particle Sizes and Spans of the Particle Size Distribution In the following bimodal polyethylene resins suitable for pipe applications are polymerized in a multi-stage process comprising a homopolymerization stage in a loop reactor and a copolymerization stage with 1-hexene in a double cone. As polymerization catalyst 4 is used. The reactor set up and polymerization conditions are kept constant in all examples. The examples differ in the particle size and spans of the particle size distribution of catalyst 4. The particle size and spans of the particle size distribution of catalyst 4 can be amended by using different supports having different particle size and spans of the particle size distribution when preparing catalyst 4.

Example 11 (Comparative)

In the first example, particles of catalyst 4 exhibiting mean average activity in loop and gas phase reactor conditions equal to 20 kg/$g_{cat}$/h and 12 kg/$g_{cat}$/h, having also mean size equal to $d_{50}$=25 μm and span equal to 1.6 was used to produce a pipe grade. The mean residence time in the loop reactor was 1 h and in double cone reactor (DCR) 2 h. The particle size distribution in the double cone reactor was broad (i.e., span=1.6) and operability issues related to both particle carry over and particle overheating was observed (see Table 15).

TABLE 15

Key size-related features of catalyst and polymer particles and DCR performance.

| Feature | Value |
| --- | --- |
| Catalyst $d_{50}$ [μm] | 25 |
| Catalyst Span | 1.6 |
| Polymer $d_{50}$ in DCR [μm] | 950 |
| Polymer $d_{10}$ in DCR [μm] | 390 |
| Polymer $d_{90}$ in DCR [μm] | 1945 |
| Polymer Span | 1.6 |
| Superficial gas velocity [m/s] | 0.55 |
| Chunking and Sheeting | Significant |

Example 12 (Inventive)

In Example 12, the polymerization series described in Example II was repeated with a catalyst particle size distribution (PSD) features as described by the correlation of formula (III) (see FIG. 6). It is obvious that by selecting the catalyst span proposed in the correlation of formula (III), less operability issues are manifested in gas phase reactor (see Table 16). It can be concluded that in this case the tendency of particle overheating and the solids entrainment rate are substantially lower compared to the case where a catalyst PSD was selected to be out of the proposed range described in FIG. 4.

TABLE 16

Key size-related features of catalyst and polymer particles and DCR performance.

| Feature | Value |
|---|---|
| Catalyst $d_{50}$ [μm] | 25 |
| Catalyst Span | 1.1 |
| Polymer $d_{50}$ in DCR [μm] | 970 |
| Polymer $d_{10}$ in DCR [μm] | 390 |
| Polymer $d_{90}$ in DCR [μm] | 1480 |
| Polymer Span | 1.1 |
| Superficial gas velocity [m/s] | 0.55 |
| Chunking and Sheeting | Not Observed |

8. Polymerization of Bimodal Polyethylene Pipe Grades in Multi-Stage Process with a Fluidized Bed Gas Phase Reactor Comprising a Distribution Plate and a Disengaging Zone Using Metallocene Catalysts with Different Particle Sizes and Spans of the Particle Size Distribution In the following bimodal polyethylene resins suitable for pipe applications are polymerized in a multi-stage process comprising a homopolymerization stage in a loop reactor and a copolymerization stage with 1-hexene in a fluidized bed gas phase reactor comprising a distribution plate and a disengaging zone. As polymerization catalyst 6 is used. The reactor set up and polymerization conditions are kept constant in all examples. The examples differ in the particle size and spans of the particle size distribution of catalyst 6. The particle size and spans of the particle size distribution of catalyst 6 can be amended by using different supports having different particle size and spans of the particle size distribution when preparing catalyst 6.

Example 13 (Comparative)

In the first example, particles of catalyst 6 exhibiting mean average activity in loop and gas phase reactor conditions equal to 16 kg/$g_{cat}$/h and 10 kg/$g_{cat}$/h, having also mean size equal to $d_{50}$=30 μm and span equal to 1.83 was used to produce a pipe grade. Catalyst 6 has a skeletal density of 2.1 g/ml. The mean residence time in the loop reactor was 1 h and in gas phase reactor 2 h. The particle size distribution in the gas phase reactor was very broad (i.e., span=2.0) and severe operability issues related to poor mixing, particle segregation and particle overheating was observed (see Table 17).

TABLE 17

Key size-related features of metallocene catalyst and polymer particles and GPR performance.

| Feature | Value |
|---|---|
| Catalyst $d_{50}$ [μm] | 30 |
| Catalyst Span | 1.83 |
| Polymer $d_{50}$ in GPR [μm] | 510 |
| Polymer $d_{10}$ in GPR [μm] | 220 |
| Polymer $d_{90}$ in GPR [μm] | 1250 |
| Polymer Span | 2.0 |
| Superficial gas velocity [m/s] | 0.4 |
| Solids carry over | Significant |
| Chunking and Sheeting | Significant |
| Segregation/poor mixing | Yes |

Example 14 (Inventive)

In Example 14, the polymerization series described in Example 13 was repeated with a catalyst particle size distribution (PSD) features as described by the correlation of formula (II) (see FIG. 5). It is obvious that by selecting the catalyst span proposed in the correlation of formula (II), less operability issues are manifested in gas phase reactor (see Table 18). It can be concluded that in this case the tendency of particle overheating and the solids entrainment rate are substantially lower compared to the case where a catalyst PSD was selected to be out of the proposed range described in FIG. 3.

TABLE 18

Key size-related features of metallocene catalyst and polymer particles and GPR performance.

| Feature | Value |
|---|---|
| Catalyst $d_{50}$ [μm] | 25 |
| Catalyst Span | 0.4 |
| Polymer $d_{50}$ in GPR [μm] | 700 |
| Polymer $d_{10}$ in GPR [μm] | 320 |
| Polymer $d_{90}$ in GPR [μm] | 1100 |
| Polymer Span | 1.1 |
| Superficial gas velocity [m/s] | 0.4 |
| Solids carry over | Not Detected |
| Chunking and Sheeting | Not Observed |
| Segregation/poor mixing | No |

The invention claimed is:

1. A process for polymerizing ethylene or copolymerizing ethylene and at least one alpha-olefin comonomer with 3 to 12 carbon atoms in the presence of a supported polymerization catalyst in a multi-stage polymerization process in which at least two polymerization stages are connected in series and a last polymerization stage is conducted in a gas phase reactor to obtain an ethylene homo- or copolymer, wherein
   (a) in the first polymerization stage, which is not a pre-polymerization stage, the catalyst activity is at least 15 kg/$g_{catalyst}$/h; and
   (b) in each polymerization stage subsequent to said first polymerization stage, the catalyst activity is not more than 75% of the catalyst activity in said first polymerization stage.

2. The process according to claim 1, wherein the supported polymerization catalyst is selected from a supported Ziegler-Natta catalyst gr a supported metallocene catalyst.

3. The process according to claim 1, wherein the supported polymerization catalyst is selected from a silica supported polymerization catalyst, a $MgCl_2$-supported polymerization catalyst, a silica/$MgCl_2$-supported polymerization catalyst, or a self-supported polymerization catalyst.

4. The process according to claim 1, wherein the supported polymerization catalyst has a skeletal catalyst density of more than 1.3 g/ml.

5. The process according to claim 1, wherein the supported polymerization catalyst has a median particle size $d_{50cat}$ of from 5 to 30 μm.

6. The process according to claim 1, wherein the particle size distribution of the supported polymerization catalyst ($PSD_{cat}$) has a relative span of less than 1.6, wherein the relative span follows the equation (I)

$$\text{span}_{cat}=(d_{90cat}-d_{10cat})/d_{50cat} \quad (I)$$

wherein $\text{span}_{cat}$ is the relative span of the particle size distribution of the supported polymerization catalyst ($PSD_{cat}$);

$d_{90cat}$ is the diameter of the particles of the supported polymerization catalyst at which 90% of the sample's mass is comprised of particles with a diameter less than this value in μm, $d_{50cat}$ is the diameter of the particles of the supported polymerization catalyst at which 50% of the sample's mass is comprised of particles with a diameter less than this value (median particle size) in μm, and $d_{10cat}$ is the diameter of the particles of the supported polymerization catalyst at which 10% of the sample's mass is comprised of particles with a diameter less than this value in μm.

7. The process according to claim 1, wherein the last polymerization stage is conducted in a fluidized bed reactor comprising a comprising a distribution plate and a disengaging zone and the particle size distribution of the supported catalyst particles ($PSD_{cat}$), in the last polymerization stage, has a relative span following the inequation (II)

$$\text{span}_{cat} \leq 2.4-0.16 \cdot d_{50cat}+0.0107 \cdot d_{50cat}^2 - 2.58 \cdot 10^{-4} \cdot d_{50cat}^3 \quad (II)$$

wherein $\text{span}_{cat}$ is the relative span of the particle size distribution of the supported catalyst particle ($PSD_{cat}$) in the last polymerization stage and is defined by the formula $\text{span}_{cat}=(d_{90cat}-d_{10cat})/d_{50cat}$; wherein $d_{50cat}$ is the diameter of the particles of the supported polymerization catalyst at which 50% of the sample's mass is comprised of particles with a diameter less than this value (median particle size) in μm;

$d_{90cat}$ is the diameter of the particles of the supported polymerization catalyst at which 90% of the sample's mass is comprised of particles with a diameter less than this value in μm, and $d_{10cat}$ is the diameter of the particles of the supported polymerization catalyst at which 10% of the sample's mass is comprised of particles with a diameter less than this value in μm.

8. The process according to claim 1, wherein the last polymerization stage is conducted in a double cone reactor and the particle size distribution of the supported catalyst particles ($PSD_{cat}$), in the last polymerization stage, has a relative span following the inequation (III)

$$\text{span}_{cat} \leq 2.81-0.20 \cdot d_{50cat}+0.0131 \cdot d_{50cat}^2 - 3.12 \cdot 10^{-4} \cdot d_{50cat}^3 \quad (III)$$

wherein $\text{span}_{cat}$ is the relative span of the particle size distribution of the supported catalyst particles ($PSD_{cat}$) in the last polymerization stage and is defined by the formula $\text{span}_{cat}=(d_{90cat}-d_{10cat})/d_{50cat}$;

$d_{50cat}$ is the diameter of the particles of the supported polymerization catalyst at which 50% of the sample's mass is comprised of particles with a diameter less than this value (median particle size) in μm;

$d_{90cat}$ is the diameter of the particles of the supported polymerization catalyst at which 90% of the sample's mass is comprised of particles with a diameter less than this value in μm, and $d_{10cat}$ is the diameter of the particles of the supported polymerization catalyst at which 10% of the sample's mass is comprised of particles with a diameter less than this value in μm.

9. The process according to claim 1, wherein the particle size $d_{90}$ of the ethylene homo- or copolymer, ($d_{90PE}$), which is the diameter of the particles of the supported polymerization catalyst at which 90% of the sample's mass is comprised of particles with a diameter less than this value in μm, in the last polymerization stage, is within the range of from 300 μm to 1500 μm.

10. The process according to claim 1, wherein the first polymerization stage, which is not a pre-polymerization stage, is conducted in a slurry phase reactor.

11. The process according to claim 1, which is a continuous mode multi-stage polymerization process.

12. A process of conducting polymerization of an ethylene homo- or copolymer comprising utilizing supported polymerization catalyst particles having a median particle size $d_{50cat}$ of from 5 to 30 μm in a multi-stage polymerization process in which at least two polymerization stages are connected in series and the last polymerization stage is conducted in a gas phase reactor, wherein (a) in a first polymerization stage, which is not a pre-polymerization stage, the catalyst activity is at least 15 kg/$g_{catalyst}$/h;

(b) in each polymerization stage subsequent to said first polymerization stage, the catalyst activity is not more than 75% of the catalyst activity in said first polymerization stage; and (c) the particle size distribution of the supported polymerization catalyst particles ($PSD_{cat}$) has a relative span following the inequation (II)

$$\text{span}_{cat} \leq 2.4-0.16 \cdot d_{50cat}+0.0107 \cdot d_{50cat}^2 - 2.58 \cdot 10^{-4} \cdot d_{50cat}^3 \quad (II),$$

wherein:

$\text{span}_{cat}$ is the relative span of the particle size distribution of the supported polymerization catalyst particles ($PSD_{cat}$) and is defined by the formula $\text{span}_{cat}=(d_{90cat}-d_{10cat})/d_{50cat}$;

$d_{50cat}$ is the diameter of the supported polymerization catalyst at which 50% of a sample's mass is comprised of particles with a diameter less than this value (median particle size) in μm;

$d_{90cat}$ is the diameter of the particles of the supported polymerization catalyst at which 90% of the sample's mass is comprised of particles with a diameter less than this value in μm, and $d_{10cat}$ is the diameter of the particles of the supported polymerization catalyst at which 10% of the sample's mass is comprised of particles with a diameter less than this value in μm.

13. A process of conducting polymerization of an ethylene homo- or copolymer comprising utilizing supported polymerization catalyst particles having a median particle size $d_{50cat}$ of from 5 to 30 μm in a multi-stage polymerization process in which at least two polymerization stages are connected in series and a last polymerization stage is conducted in a double cone reactor wherein (a) in a first polymerization stage, which is not a pre-polymerization stage, the catalyst activity is at least 15 kg/g$_{catalyst}$/h;

(b) in each polymerization stage subsequent to said first polymerization stage, the catalyst activity is not more than 75% of the catalyst activity in said first polymerization stage; and (c) the particle size distribution of the supported polymerization catalyst particles (PSDcat) has a relative span following the inequation (II)

$$\text{span}_{cat} \leq 2.81 - 0.20 \cdot d_{50cat} + 0.0131 \cdot d_{50cat}^2 - 3.12 \cdot 10^{-4} \cdot d_{50cat}^3 \quad \text{(III)}$$

wherein:

span$_{cat}$ is a relative span of the particle size distribution of the supported polymerization catalyst particles (PSD$_{cat}$) and is defined by the formula span$_{cat}$=(d$_{90cat}$−d$_{10cat}$)/d$_{50cat}$;

d$_{50cat}$ is the diameter of the particles of the supported polymerization catalyst at which 50% of a sample's mass is comprised of particles with a diameter less than this value (median particle size) in μm;

d$_{90cat}$ is the diameter of the particles of the supported polymerization catalyst at which 90% of the sample's mass is comprised of particles with a diameter less than this value in μm, and d$_{10cat}$ is the diameter of the particles of the supported polymerization catalyst at which 10% of the sample's mass is comprised of particles with a diameter less than this value in μm.

* * * * *